United States Patent
Duan et al.

(10) Patent No.: US 12,436,268 B2
(45) Date of Patent: Oct. 7, 2025

(54) RECONFIGURABLE INTELLIGENT SURFACE (RIS)-AIDED UE PASSIVE RF SENSING

(71) Applicant: QUALCOMM Incorporated, San Diego, CA (US)

(72) Inventors: Weimin Duan, San Diego, CA (US); Alexandros Manolakos, Escondido, CA (US); Seyong Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 271 days.

(21) Appl. No.: 18/251,205

(22) PCT Filed: Dec. 21, 2021

(86) PCT No.: PCT/US2021/073062
§ 371 (c)(1),
(2) Date: Apr. 28, 2023

(87) PCT Pub. No.: WO2022/164596
PCT Pub. Date: Aug. 4, 2022

(65) Prior Publication Data
US 2023/0408677 A1 Dec. 21, 2023

(30) Foreign Application Priority Data
Jan. 28, 2021 (GR) ............................ 20210100053

(51) Int. Cl.
*G01S 13/87* (2006.01)
*G01S 7/00* (2006.01)
(Continued)

(52) U.S. Cl.
CPC ............ *G01S 13/878* (2013.01); *G01S 7/006* (2013.01); *G01S 13/003* (2013.01); *G01S 2013/464* (2013.01); *G01S 2013/466* (2013.01)

(58) Field of Classification Search
CPC .................. G01S 13/003; G01S 13/878; G01S 2013/464; G01S 2013/466; G01S 7/006;
(Continued)

(56) References Cited

U.S. PATENT DOCUMENTS

| | | | | |
|---|---|---|---|---|
| 2023/0176174 A1* | 6/2023 | Penna | ...................... | H01Q 3/46 342/451 |
| 2023/0327714 A1* | 10/2023 | Baligh | ................... | H04B 7/088 375/262 |
| 2023/0421412 A1* | 12/2023 | Zegrar | ................ | H04L 25/0224 |

OTHER PUBLICATIONS

International Search Report and Written Opinion—PCT/US2021/073062—ISA/EPO—Apr. 11, 2022.
(Continued)

*Primary Examiner* — Timothy X Pham
(74) *Attorney, Agent, or Firm* — Weaver Austin Villeneuve & Sampson LLP/QUALCOMM

(57) ABSTRACT

Techniques are disclosed for determining an object's location by using a Reconfigurable Intelligent Surface (RIS) to aid in RF sensing. Radar techniques can be used in which one or more base stations act as a transmitter and a receiving device acts as a receiver in a bistatic or multi-static radar configuration where an RIS directs signals transmitted by the one or more base stations to the receiving device. By comparing the time a line-of-sight (LOS) signal (redirected to the receiving device by the RIS) is received by the receiving device with that of an echo signal (redirected to the receiving device by the RIS) from a reflection of an RF signal from the object, a position of the object can be determined. Depending on desired functionality, this posi-
(Continued)

tion can be determined by the receiving device or by a location server or other network entity.

37 Claims, 14 Drawing Sheets

(51) Int. Cl.
  *G01S 13/00* (2006.01)
  *G01S 13/46* (2006.01)
(58) Field of Classification Search
  CPC ..... G01S 1/00; G01S 3/00; G01S 5/00; G01S 7/00; G01S 11/00; G01S 13/00; G01S 15/00; G01S 17/00; G01S 19/00; G01S 2201/00; G01S 2205/00
  See application file for complete search history.

(56) References Cited

OTHER PUBLICATIONS

Lu W., et al., "Intelligent Reflecting Surface-Enhanced Target Detection in MIMO Radar", IEEE Sensors Letters, IEEE, vol. 5, No. 2, Jan. 18, 2021 (Jan. 18, 2021), pp. 1-4, XP011837304, DOI: 10.1109/LSENS.2021.3052753 [retrieved on Feb. 8, 2021], figure 1.
Wymeersch H., et al., "Radio Localization and Mapping with Reconfigurable Intelligent Surfaces", Arxiv.org, 201 Olin Library Cornell University, Ithaca, NY, 14853, Dec. 19, 2019, XP081569725, pp. 1-7, Figure 1, Abstract, Right-Hand Column, Lines 29-31, Figure 3, pp. 5,6, p. 2, left-hand column, line 2-8 p. 3, left-hand column, line 2-4 p. 4, right-hand column lines 6, 7, 11, 12, 36, 37 p. 5, left-hand column, line 15-17, pp. 5,6.

\* cited by examiner

RECONFIGURABLE INTELLIGENT SURFACE (RIS)-AIDED UE PASSIVE RF SENSING

RELATED APPLICATIONS

This application is a National Phase entry of International Application No. PCT/US2021/073062, filed Dec. 21, 2021, entitled "RECONFIGURABLE INTELLIGENT SURFACE (RIS)-AIDED UE PASSIVE RF SENSING" which claims the benefit of Greek application No. 20210100053, filed Jan. 28, 2021, entitled "RECONFIGURABLE INTELLIGENT SURFACE (RIS)-AIDED UE PASSIVE RF SENSING," both of which are assigned to the assignee hereof, and incorporated by reference herein in their entirety.

BACKGROUND

1. Field of Invention

The present invention relates generally to the field of wireless communications, and more specifically to determining the location or position of an object with radio frequency (RF) signals using bistatic or multi-static radar techniques.

2. Description of Related Art

In a wireless communication network, RF sensing techniques can be used to determine the position of an object. Some of these positioning techniques may involve determining distance and/or angular information of RF signals transmitted by one or more base stations of the wireless communication network and received by one or more receiving devices. However, in some instances, blockages may prevent the receipt of such RF signals by the one or more receiving devices.

BRIEF SUMMARY

Embodiments described herein provide for the determination of the location of an object using a Reconfigurable Intelligent Surface (RIS) to aid in RF sensing. More specifically, an object may be detected in a wireless data communication network using radar techniques in which one or more base stations act as a transmitter and a receiving device acts as a receiver in a bistatic or multi-static radar configuration where an RIS directs signals transmitted by the one or more base stations to the receiving device. By comparing the time a line-of-sight (LOS) signal (redirected to the receiving device by the RIS) is received by the receiving device with that of an echo signal (redirected to the receiving device by the RIS) from a reflection of an RF signal from the object, a position of the object can be determined. Depending on desired functionality, this position can be determined by the receiving device or by a location server or other network entity.

An example method of performing radio frequency (RF) sensing with a receiving device and a reconfigurable intelligent surface (RIS) in a wireless communications system, according to this disclosure, comprises configuring the RIS to reflect a line-of-sight (LOS) wireless signal toward the receiving device, where the LOS wireless signal may comprise a first wireless reference signal transmitted by a transmission reception point (TRP) of the wireless communications system. The method also comprises configuring the RIS to reflect an echo signal toward the receiving device, where the echo signal may comprise a reflection, off of an object, of a second wireless reference signal transmitted by the TRP of the wireless communications system. The method also comprises determining a position of the object based on: a position of the RIS relative to the TRP, and a time difference between a first time of arrival (ToA) of the LOS wireless signal at the receiving device and a second ToA of the echo signal at the receiving device. The method also comprises providing the position of the object.

An example device, according to this disclosure, comprises a transceiver, a memory, and one or more processing units communicatively coupled with the transceiver and the memory. The one or more processing units are configured to configure a reconfigurable intelligent surface (RIS) to reflect a line-of-sight (LOS) wireless signal toward a receiving device, where the LOS wireless signal may comprise a first wireless reference signal transmitted by a transmission reception point (TRP) of a wireless communications system. The one or more processing units are also configured to configure the RIS to an echo signal toward the receiving device, where the echo signal may comprise a reflection, off of an object, of a second wireless reference signal transmitted by the TRP of the wireless communications system. The one or more processing units are also configured to determine a position of the object based on: a position of the RIS relative to the TRP, and a time difference between a first time of arrival (ToA) of the LOS wireless signal at the receiving device and a second ToA of the echo signal at the receiving device. The one or more processing units are also configured to provide the position of the object.

Another example device, according to this disclosure, comprises means for configuring a reconfigurable intelligent surface (RIS) to reflect a line-of-sight (LOS) wireless signal toward a receiving device, where the LOS wireless signal may comprise a first wireless reference signal transmitted by a transmission reception point (TRP) of a wireless communications system. The device also comprises means for configuring the RIS to reflect an echo signal toward the receiving device, where the echo signal may comprise a reflection, off of an object, of a second wireless reference signal transmitted by the TRP of the wireless communications system. The device also comprises means for determining a position of the object based on a position of the RIS relative to the TRP, and a time difference between a first time of arrival (ToA) of the LOS wireless signal at the receiving device and a second ToA of the echo signal at the receiving device. The device also comprises means for providing the position of the object.

An example non-transitory computer-readable medium, according to this disclosure, stores instructions for performing radio frequency (RF) sensing with a receiving device and a reconfigurable intelligent surfaces (RIS) in a wireless communications system. The instructions comprise code for configuring the RIS to reflect a line-of-sight (LOS) wireless signal toward a receiving device, where the LOS wireless signal may comprise a first wireless reference signal transmitted by a transmission reception point (TRP) of the wireless communications system. The instructions also comprise code for configuring the RIS to reflect an echo signal toward the receiving device, where the echo signal may comprise a reflection, off of an object, of a second wireless reference signal transmitted by the TRP of the wireless communications system. The instructions also comprise code for determining a position of the object based on: a position of the RIS relative to the TRP, and a time difference between a first time of arrival (ToA) of the LOS wireless signal at the receiving device and a second ToA of the echo signal at the receiving device. The instructions also comprise code for providing the position of the object.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
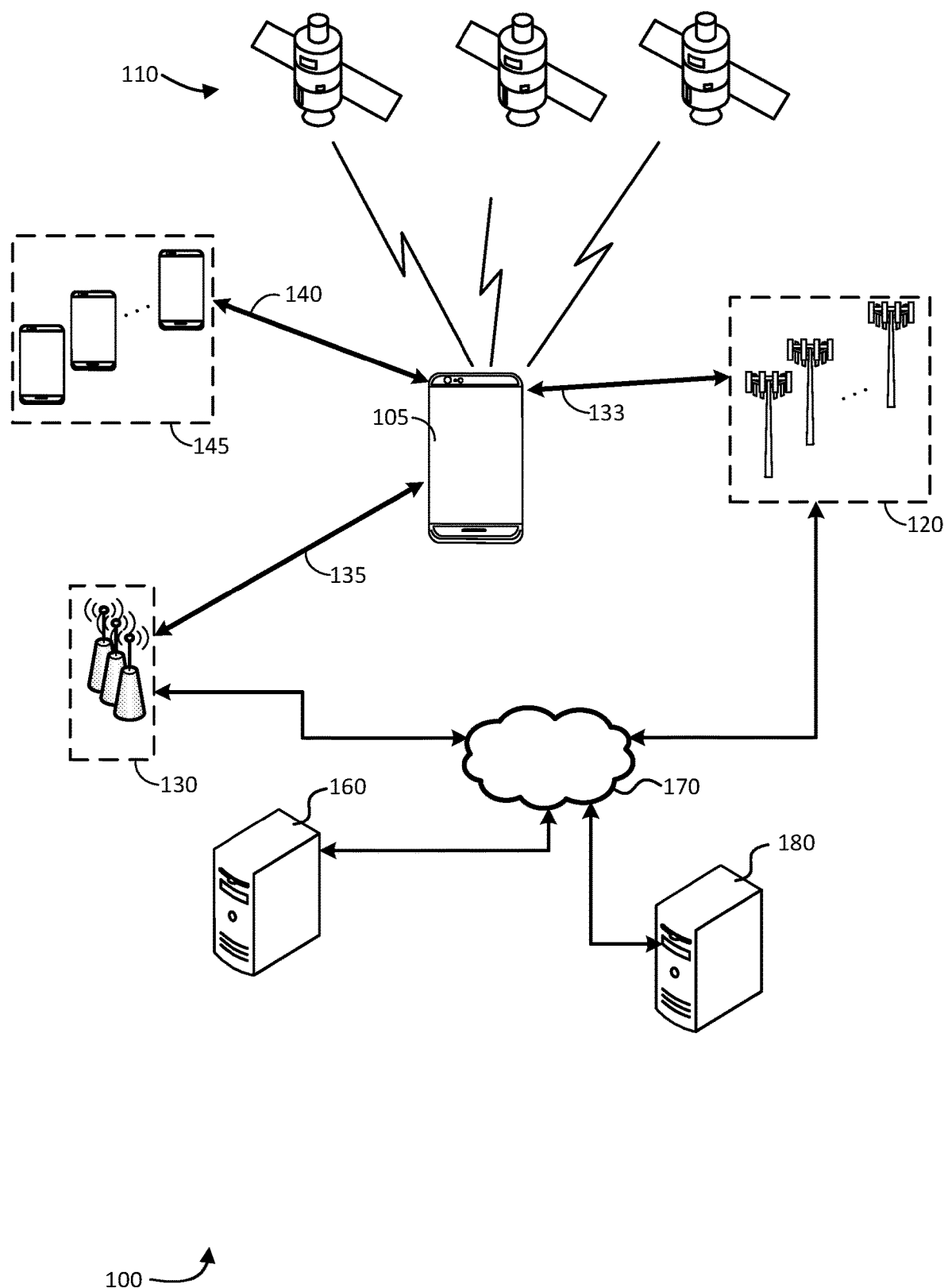
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While some embodiments in which one or more aspects of the disclosure may be implemented as described below, other embodiments may be used, and various modifications may be made without departing from the scope of the disclosure.

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" or "reference signal" comprises an electromagnetic wave that transports information through the space between a transmitter (or transmitting device) and a receiver (or receiving device). As used herein, a transmitter may transmit a single "reference signal" or multiple "reference signals" to a receiver. However, the receiver (or different receivers) may receive multiple "reference signals" corresponding to each transmitted RF signal due to the propagation characteristics of RF signals through multipath channels. The same transmitted RF signal on different paths between the transmitter and receiver may be referred to as a "multipath" RF signal.

FIG. 1 is a simplified illustration of a positioning system 100 in which a user equipment (UE) 105, location server 160, and/or other components of the positioning system 100 can use the techniques provided herein for determining an estimated location of UE 105 and further performing reconfigurable intelligent surface (RIS)-aided UE passive RF sensing, according to an embodiment. It can be noted, however, that techniques described herein are not necessarily limited to a positioning system 100. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135, or via one or more other UEs 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120 and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other UEs 145, which may be mobile or fixed. When one or more other UEs 145 are used in the position determination of a particular UE 105, the UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location (including, e.g., the location of a base station 120 or AP 130) or some other location such as a location for UE 105 at some known previous time, or a location of another UE 145 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence)

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, asset tracking or child or pet location). Additionally or alternatively, the external client 180 may obtain and provide the location of UE 105 to an emergency services provider, government agency, etc.

As previously noted, the example positioning system 100 can be implemented using a wireless communication network, such as an LTE-based or 5G NR-based network. 5G NR is a wireless RF interface undergoing standardization by the 3rd Generation Partnership Project (3GPP). 5G NR is poised to offer enhanced functionality over previous generation (LTE) technologies, such as significantly faster and more responsive mobile broadband, enhanced conductivity through Internet of Things (IoT) devices, and more. Additionally, 5G NR enables new positioning techniques for UEs, including Angle of Arrival (AoA)/Angle of Departure (AoD) positioning, UE-based positioning, and multi-cell Round Trip signal propagation Time (RTT) positioning. With regard to RTT positioning, this involves taking RTT measurements between the UE and multiple base stations.

Figure 2:
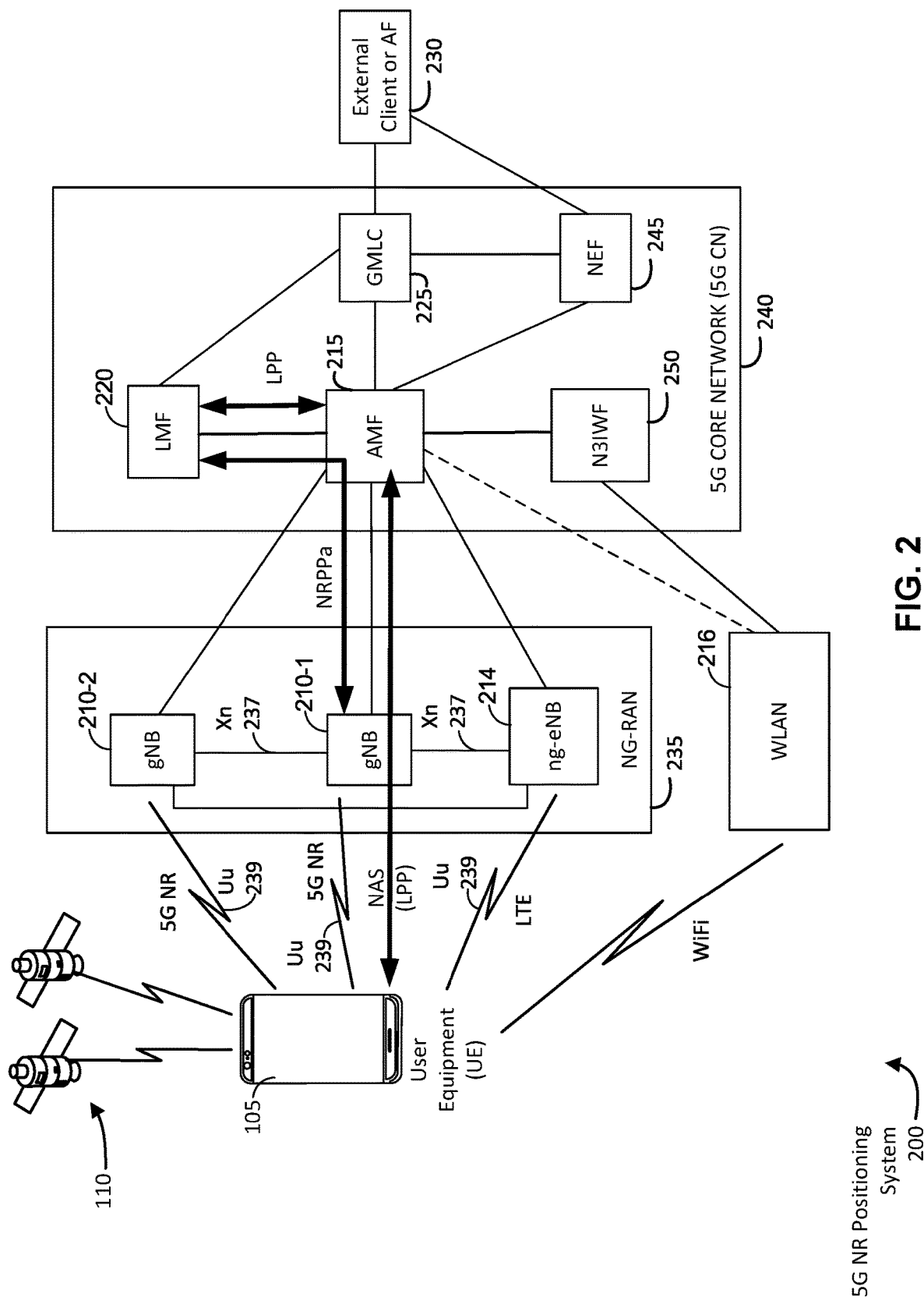
FIG. 2 is a diagram of a 5th Generation (5G) New Radio (NR) positioning system, illustrating an embodiment of a positioning system (e.g., the positioning system of FIG. 1) implemented within a 5G NR communication system.

FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes, which may include NR NodeB (gNB) 210-1 and 210-2 (collectively and generically referred to herein as gNBs 210), ng-eNB 214, and/or WLAN 216 to implement one or more positioning methods. The gNBs 210 and/or the ng-eNB 214 may correspond with base stations 120 of FIG. 1, and the WLAN 216 may correspond with one or more access points 130 of FIG. 1. Optionally, the 5G NR positioning system 200 additionally may be configured to determine the location of a UE 105 by using an LMF 220 (which may correspond with location server 160) to implement the one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of the 5G NR positioning system 200 are described below. The NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), tracking device, navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 105. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to SGCN 240 may occur if WLAN 216 is a trusted WLAN for SGCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to SGCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node (e.g., gNB 210, ng-eNB 214, or WLAN 216) of a first RAT to an access node of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as SGCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in SGCN 240. The NEF 245 may support secure exposure of capabilities and events concerning SGCN 240 and UE 105 to the external client 230, which may then be referred to as an Access Function (AF) and may enable secure provision of information from external client 230 to SGCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAoA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD And/or AoA.

Figure 3:
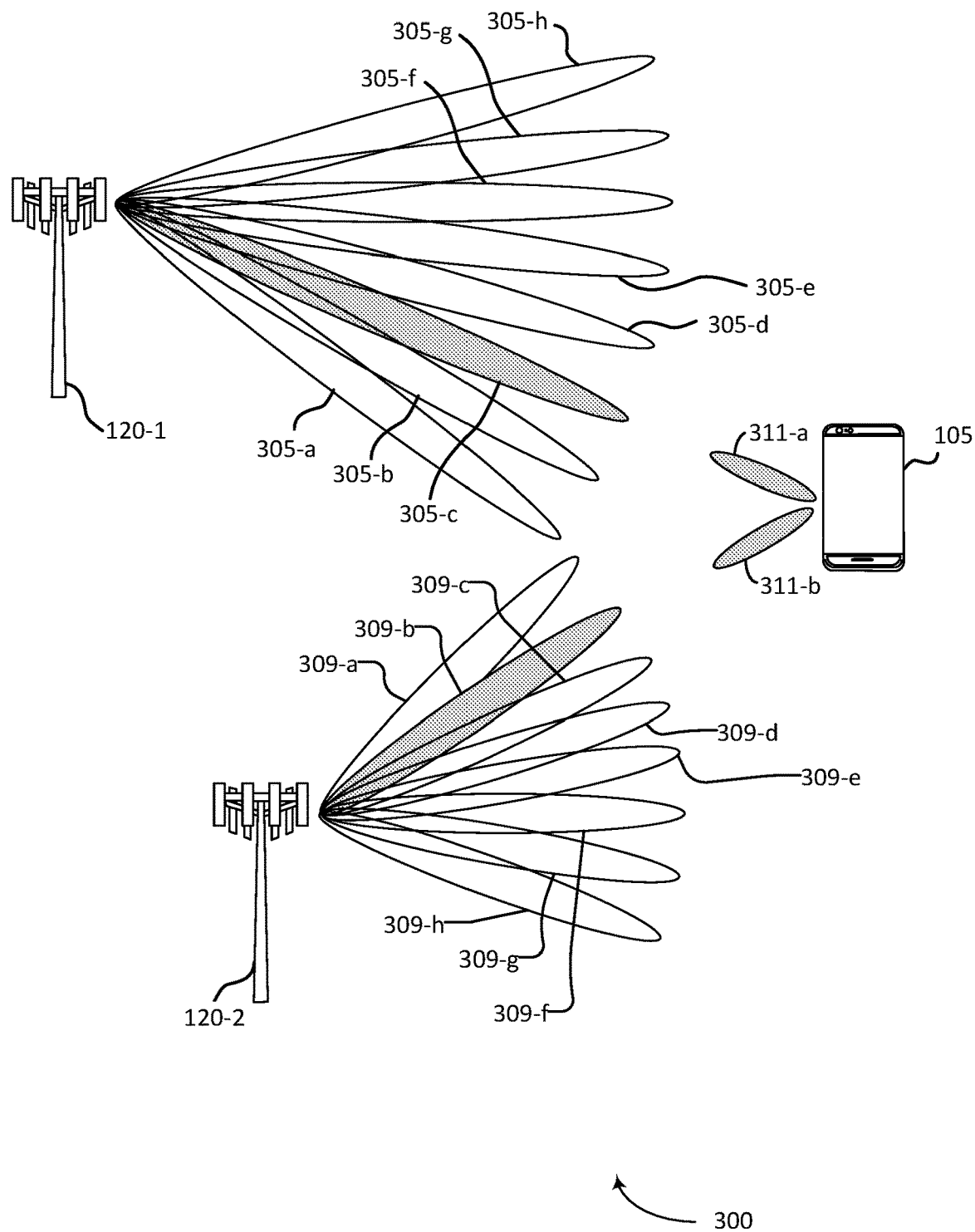
FIG. 3 is a diagram illustrating beamforming in a 5G NR positioning system.

FIG. 3 is a diagram illustrating a simplified environment 300 including two base stations 120-1 and 120-2 (which may correspond to base stations 120 of FIG. 1 and/or gNBs 210 and/or ng-eNB 214 of FIG. 2) producing directional beams for transmitting RF reference signals, and a UE 105. Each of the directional beams is rotated, e.g., through 120 or 360 degrees, for each beam sweep, which may be periodically repeated. Each direction beam can include an RF reference signal (e.g., a PRS resource), where base station 120-1 produces a set of RF reference signals that includes Tx beams 305-*a*, 305-*b*, 305-*c*, 305-*d*, 305-*e*, 305-*f*, 305-*g*, and 305-*h*, and the base station 120-2 produces a set of RF reference signals that includes Tx beams 309-*a*, 309-*b*, 309-*c*, 309-*d*, 309-*e*, 309-*f*, 309-*g*, and 309-*h*. Because UE 105 may also include an antenna array, it can receive RF reference signals transmitted by base stations 120-1 and 120-2 using beamforming to form respective receive beams (Rx beams) 311-*a* and 311-*b*. Beamforming in this manner (by base stations 120 and optionally by UEs 105) can be used to make communications more efficient. It can also be used for other purposes, such as transmitting reference signals for RF sensing of an object. (An object detected using the radar techniques described herein is also referred to herein as a "target.")

Tx beams 305 and 309 can be particularly useful for facilitating efficient communications between a base station 120 and UE 105. And as noted, Tx beams can be used to make angular measurements (e.g., AoD measurements) for the positioning of the UE 105. Tx beams 305 and 309 further may be used to perform RF sensing of a target by the UE 105, in which RF signals can be directed toward the target via one or more beams, and one or more echo signals resulting from the RF signals reflecting off of the target is detected by the UE 105. Based on the one or more echo signals detected by the UE, information regarding the target (e.g., position, object type, etc.) may be determined. More generally, this process can be used to perform RF sensing to detect one or more targets near a UE 105. Further, such RF sensing can be conducted with or without the use of Tx beams 305 and 309.

Figure 4A:
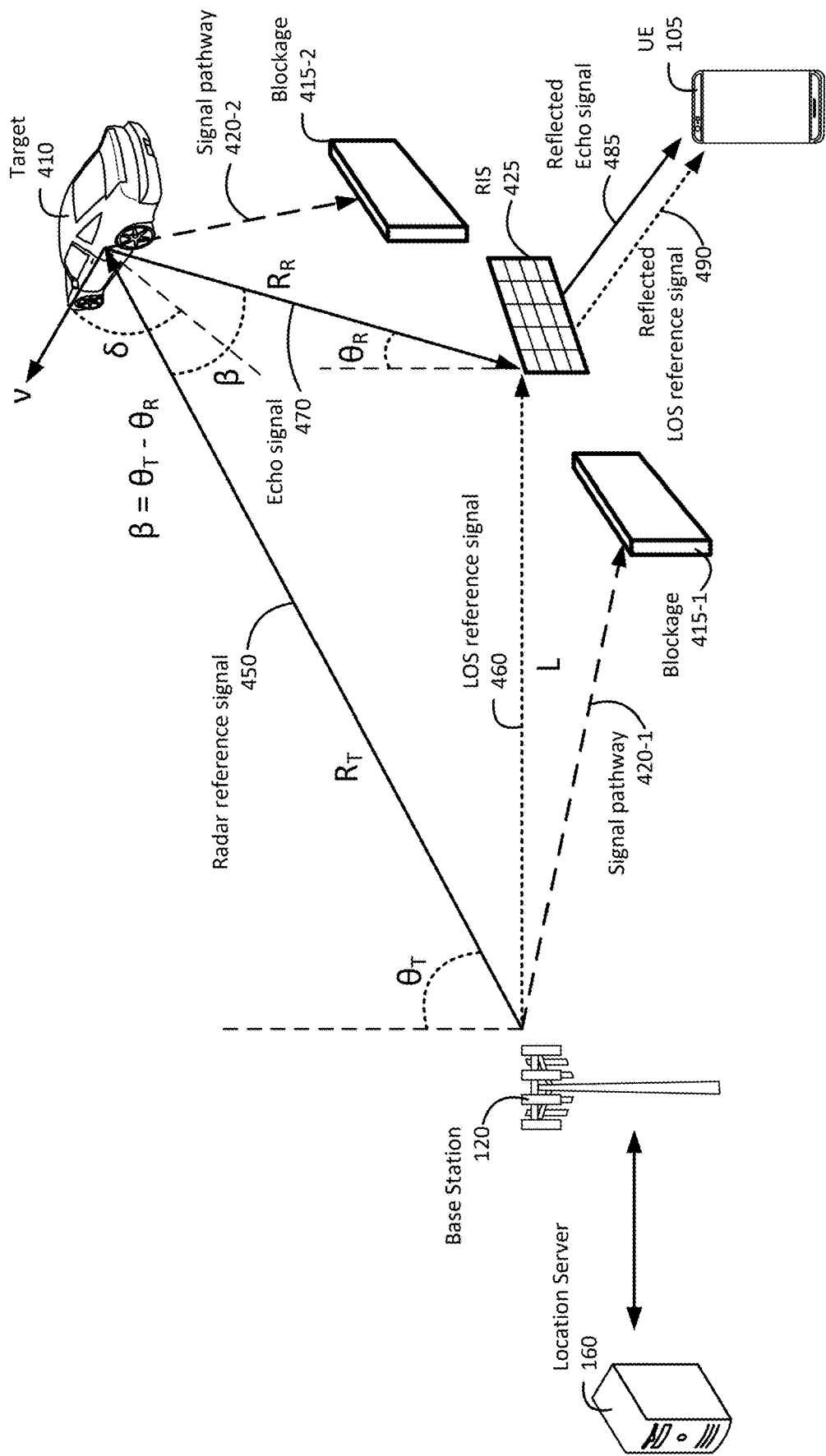
FIGS. 4A and 4B are simplified diagrams illustrating how radiofrequency (RF) sensing of a target may be performed using a Reconfigurable Intelligent Surface (RIS), according to an embodiment.
Figure 4B:
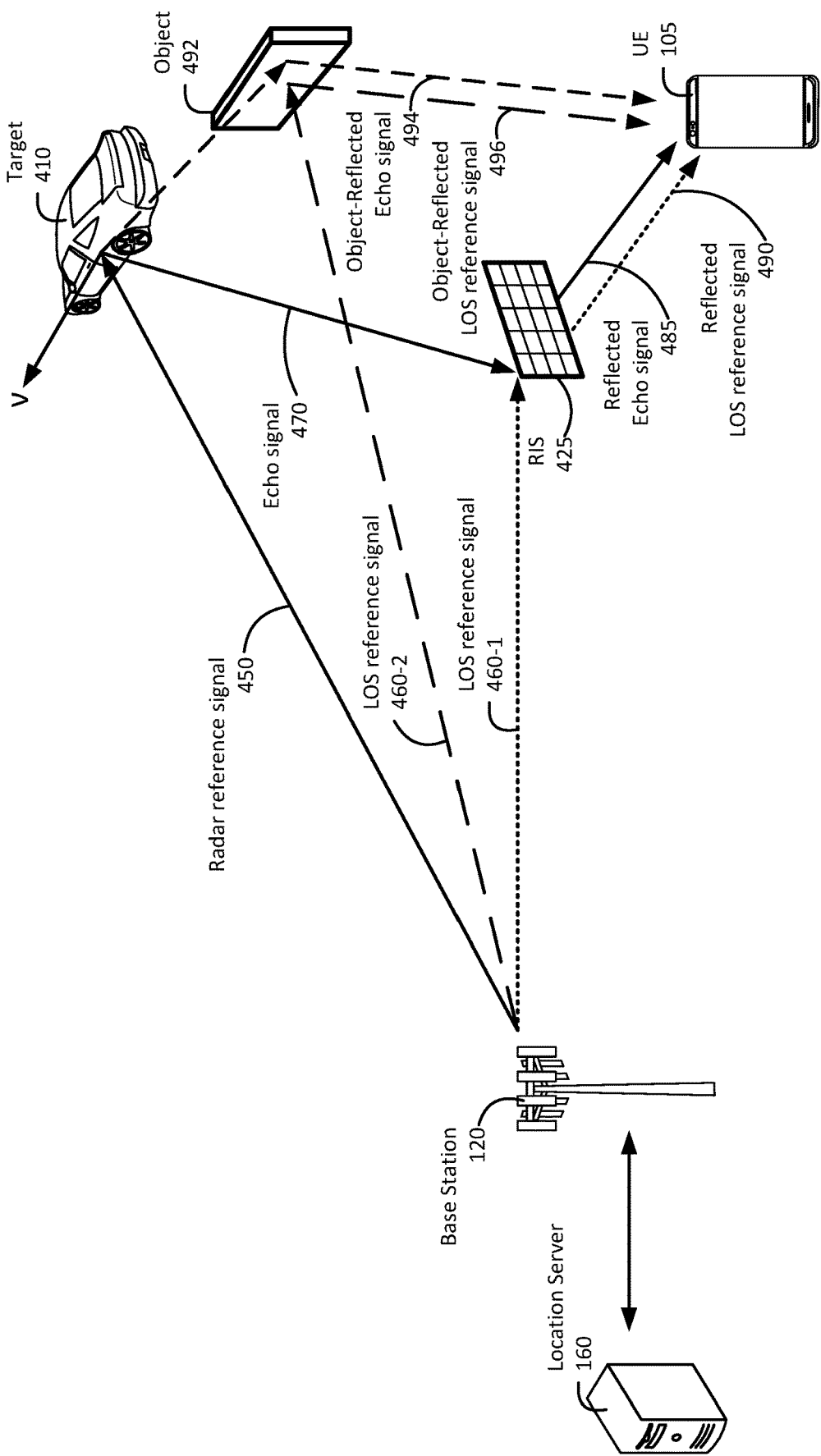

This type of RF sensing can be limited in the presence of one or more objects that can cause a blockage in the RF channel between a base station 120 and UE 105. That is, RF sensing may be difficult to perform in situations where one or more blockages restrict RF signals from traveling between the base station 120 and UE 105 and/or between a target and UE 105. Embodiments described herein address these and other issues by leveraging an RIS to redirect RF signals, enabling for RF sensing to occur even in the presence of one or more blockages. FIGS. 4A and 4B and the following description below additional details regarding how this may be done.

FIG. 4A is a simplified diagram illustrating how RF sensing can be used to determine the position of a target 410, according to an embodiment. Here, RF sensing is performed using a bistatic radar configuration, where the base station 120 (which may comprise a serving base station for the UE 105) performs the function of a radar transmitter and the UE 105 performs the function of a radar receiver. However, in instances where there is a blockage 415-1 blocking a signal pathway 420-1 from the base station 120 to the UE 105 and/or a blockage 415-2 blocking a signal pathway 420-2 from the target 410 to the UE 105, RF sensing may be otherwise difficult or impossible without the use of RIS 425.

RISs (which also may be referred to as a software-controlled metasurfaces, intelligent reflecting surfaces, or reconfigurable reflect arrays/metasurfaces) are garnering recent attention in wireless communication applications as a means to enable propagation paths for RF signals around blockage. Although the RIS 425 may be a passive device, it may comprise an array and may therefore redirect RF signals using beamforming. As such, the RIS 425 can enable wireless coverage of the base station 120 (or, more broadly, the wireless network of the base station 120) to extend to otherwise unreachable areas. The RIS 425 can do this using a software-controlled reflection/scattering profile to redirect wireless signals toward the UE 105 in real time. Additionally or alternatively, an RIS 425 may act as a repeater by receiving signals transmitted by a base station 120 and directing them toward a UE 105. (As used herein, "directing," "redirecting," "reflecting," and similar terms used when referring to the functionality of the RIS 425 may refer to the reflecting and/or repeating functionality of an RIS.) The functionality of the RIS 425 can be controlled by the base station 120 using a control channel. This adds controllable paths to the channel between the base station 120 and UE 105, which is useful in environments with severe blockage 415. With regard to RF sensing, an RIS 425 may have much higher array gain than the UE 105, and may therefore enhance the RF signal sensitivity of the UE 105 by redirecting signals toward the UE 105. This functionality may be particularly helpful in RF sensing.

According to embodiments herein, RF sensing may be performed using an RIS 425 to redirect RF signals used for RF sensing to the UE 105 (e.g., in instances where there is a blockage 415-1 blocking a signal pathway 420-1 from the base station 120 to the UE 105 and/or a blockage 415-2 blocking a signal pathway 420-2 from the target 410 to the UE 105). More specifically, detection/positioning of the target 410 may be accomplished by transmitting one or more reference signals 450, 460 from a base station 120, using the RIS 425 to redirect a line-of-sight (LOS) reference signal 460 and echo signal 470 to the UE 105, and calculating the position of the target 410 based on a difference in time at which the reflected echo signal 485 and redirected LOS reference signal 490 are received at the UE 105, along with known positions of the RIS 425 and base station 120. This process may be facilitated with the use of a location server 160. As discussed in more detail below, the UE 105 or location server 160 may determine the position of the target 410, depending on desired functionality.

It can be noted that, although a bistatic configuration is illustrated in FIG. 4A, embodiments are not so limited. According to some embodiments, multi-static configurations may be used in which there are a plurality of base stations 120 (transmitters), a plurality of RISs 425, and/or a plurality of UEs 105 (receivers). In such configurations, a position of the target 410 can be determined as described herein for each transmitter/receiver (base station 120/UE 105) pair, then determinations for all transmitter/receiver pairs can be combined. In such configurations, this can increase accuracy and/or reliability of position determination of the target 410.

Further, it can be noted that the receiving device in a bistatic or multi-static configuration for RF sensing may not be limited to a UE 105. The receiving device may comprise, for example, another base station 120 (e.g., a regular gNB or small cell gNB). Furthermore, in instances in which multiple receiving devices are used, a single RIS may reflect signals to multiple receiving devices, multiple RISs may be used to reflect signals to multiple receiving devices, and/or some receiving devices may not need RISs to reflect signals for RF sensing.

The position of the target 410 can be determined mathematically by using the one or more reference signals 450, 460 to solve for the distance, $R_R$, of the target 410 from UE 105, as well as angle, $\theta_R$. It can be noted that the reference direction from which the angle $\theta_R$ (and angle $\theta_T$) is measured may be measured from true north or based on any coordinate system used by the network for positioning (e.g., geographical coordinates, East-North-Up (ENU), etc.). As noted hereafter, solving for $R_R$ and $\theta_R$ can be accomplished based on a known position of the RIS 425 relative to base station 120 (to determine distance L).

The distance $R_R$ can be determined based on a time difference at the UE 105 of receiving the LOS reference signal 460 and echo signal 470. $R_{sum}$ may be defined as follows:

$$R_{sum} = R_T + R_R, \quad (1)$$

where $R_T$ is the distance between the base station 120 and target 410, and $R_R$ is the distance between the target 410 and RIS 425. Using equation (1) and the geometry illustrated in FIG. 4A, $R_R$ may then be determined as follows:

$$R_R = R_{sum} - \frac{R_{sum}^2 - L^2}{2(R_{sum} + L*\sin\theta_R)}. \quad (2)$$

$R_{sum}$ can be determined using (i) the time difference between the LOS reference signal 460 and echo signal 470, and (ii) the known distance between the base station 120 and UE 105. This can be expressed mathematically as:

$$R_{sum} = (T_{Rx\_echo} - T_{Rx_{Los}} + \Delta)*c + L, \quad (3)$$

where L is the distance between the base station 120 and UE 105, $T_{Rx\_echo}$ is the time (e.g., ToA) at which the echo signal 470 is received at the UE 105, $T_{Rx\_LOS}$ is the time (e.g., ToA) at which the LOS reference signal 460 is received at the UE 105, and c is the speed of RF signals 450, 460, and 470 (e.g., the speed of light). It can be noted that, because reflected echo signal 485 and reflected LOS reference signal 490 travel along the same propagation path from the RIS 425 to the UE 105, these signals experience the same delay and are effectively canceled out in the time difference $T_{Rx\_echo} - T_{Rx_{LOS}}$ of equation (3). Again, because the location of the RIS 425 is known, distance L can be determined based on the difference in the known location of the RIS 425 and the known location of the base station 120. According to some embodiments, almanacs of base station and/or RIS locations may be stored by a location server 160 and/or UE 105).

The term Δ represents a time gap (if any) between the transmission of the LOS reference signal 460 and the transmission of the radar reference signal 450. As discussed in more detail below, in some instances the LOS reference signal 460 and radar reference signal 450 may be the same RF signal, in which case the value for time gap Δ would be zero. In embodiments where the UE 105 determines the difference $T_{Rx\_echo} - T_{Rx_{LOS}}$, timing of LOS reference signal 460 and radar reference signal 450 may be provided to the UE 105 beforehand (e.g., in a communication session with the location server 160 or in a configuration provided to the UE 105 by the serving base station 120). Because this difference is dependent solely on when signals arrive, rather than when they are transmitted, no synchronizations needed between the transmitter (base station 120) and receiver (UE 105). This can be advantageous in many circumstances.

Returning to equation (2), to solve for $\Theta_R$ embodiments can use different techniques, depending on desired functionality and other factors. $\Theta_R$ is an AoA at the RIS 425. However, because the RIS 425 may not have any processing capabilities for determining taking an AoA measurement of the echo signal 470, the measurement may be determined by the UE 105 based on reflected echo signal 485. More specifically, the UE 105 can determine an AoA measurement by determining which receive beam at the RIS 425 has the highest RSRP value. The UE 105 optionally may further perform super resolution/interpolation techniques to determine a more accurate AoA. In this manner, the RIS 425 may be effectively treated like an antenna of the UE 105, enabling the UE 105 to perform an AoA measurement. Moreover, because the RIS 425 may be much larger than an antenna of the UE 105, less transmission power may be needed by the base station 120 when transmitting the LOS reference signal 460 and/or radar reference signal 450. Additionally or alternatively, multiple receivers (e.g., multiple UEs 105) can be used (or a single UE 105 at multiple locations (if target 410 is static)) to determine $\Theta_R$ using multilateration. (Multilateration may be used in other ways to determine the location of target 410, as discussed hereafter with regard to FIG. 10.)

Having determined the values of L, $R_{sum}$, and $\Theta_R$, the value for $R_R$ can be determined using equation (2), and the location of the target 410 (relative to the RIS 425) can be determined using $R_R$ and $\Theta_R$. Further, if the absolute position of the RIS 425 is known, the absolute position of the target 410 can be determined.

According to some embodiments, a Doppler frequency for the target 410 can be determined in cases where the transmitter (base station 120) and receiver (UE 105) are both static. (Where UE 105 comprises a mobile device this may mean the UE 105 is temporarily immobile—at least for the duration of the radar measurements—or movement of the UE 105 is otherwise accounted for. Movement at the UE 105 can be determined using sensor information, GNSS or other positioning measurements, etc.) Target bistatic Doppler frequency $f_D$ can be determined as:

$$f_D = \frac{2v}{c} * \cos\delta * \cos(\beta/2), \qquad (4)$$

where velocity v and angles β and δ are related to the target 410, radar reference signal 450, and echo signal 470 as illustrated in FIG. 4A. Thus, techniques provided herein may enable RF sensing of a target 410 that can be used to determine location and velocity of the target.

It can be further noted that, in some embodiments, the position of the UE 105 may also be determined using any of the positioning techniques previously described with regard to FIGS. 1-3, including GNSS-based decisioning and/or network-based positioning. This can, for example, allow the base station 120 to cause the RIS 425 to reflect the reflected echo signal 485 and reflected LOS reference signal 490 in a manner that may be more accurate (e.g., using more narrowly-formed beams) than traditional forms of using CSI-RS and/or Sounding Reference Signal (SRS) selection to improve link quality. Among other advantages, this can help increase power efficiency and reduce the likelihood of multipath.

FIG. 4B is a simplified diagram illustrating a variation to the configuration illustrated in FIG. 4A in which an object 492 reflect signals to the UE 105 that embodiments may distinguish from signals reflected by the RIS 425. Similar to FIG. 4A, the RIS 425 reflects the echo signal 470 and a first portion of the LOS reference signal 460-1 toward the UE 105, as respectively shown by reflected echo signal 485 and reflected LOS reference signal 490. In addition, the object 492 reflects an echo signal from the radar reference signal 450 and a second portion of the LOS reference signal 460-2 toward the UE 105, as respectively shown by the object-reflected echo signal 494 and object-reflected LOS reference signal 496. This could create ambiguity at the UE 105 with regard to which signals are reflected by the RIS 425 (and therefore may be used to determine the location of the target 410 as described herein).

Embodiments may avoid such ambiguity by configuring the RIS 425 to include a "watermark" on reflected echo signal 485 and/or reflected LOS reference signal 490 by adjusting the phase and/or magnitude of these reflected signals. Because an adjustment of magnitude along may be difficult for identification of the watermark, in some embodiments, the RIS may adjust the phase, and optionally adjust the magnitude. The watermark may be unique to the RIS 425 (e.g. permanently, or at least with regard to reflecting the first portion of the LOS reference signal 460-1 and/or radar reference signal 450). Put more broadly, the phase and/or amplitude of the reflection of the first portion of the LOS reference signal 460-1 and the echo signal 470 by the RIS 425 may be adjusted by the RIS to allow the RIS channel to be identified (e.g., using channel estimation). For reference signals transmitted using an orthogonal frequency-division multiplexing (OFDM) scheme, such as 4G and 5G cellular communications, phase and/or amplitude of the reflected echo signal 485 and/or reflected LOS reference signal 490 may be adjusted on a per-slot or per-symbol basis, depending on desired functionality. According to some embodiments, identification of the RIS-reflected signals (reflected echo signal 485 and reflected LOS reference signal 490) can be performed by the base station 120, UE 105, or location server 160, depending on desired functionality.

It can be further noted that the concept of watermarking can be extended to situations in which a UE receives reflected signals from multiple RISs, allowing for each RIS to be distinguished (and potentially used for positioning of the target 410). For example, if the object 492 were a second RIS, the second RIS may be configured to reflect reference signals transmitted by the base station 120 with a second watermark distinct from the watermark used by the RIS 425. This can allow for the determination of the position of the target 410 using two RISs (or more), which may be beneficial in different circumstances.

Figure 5A:
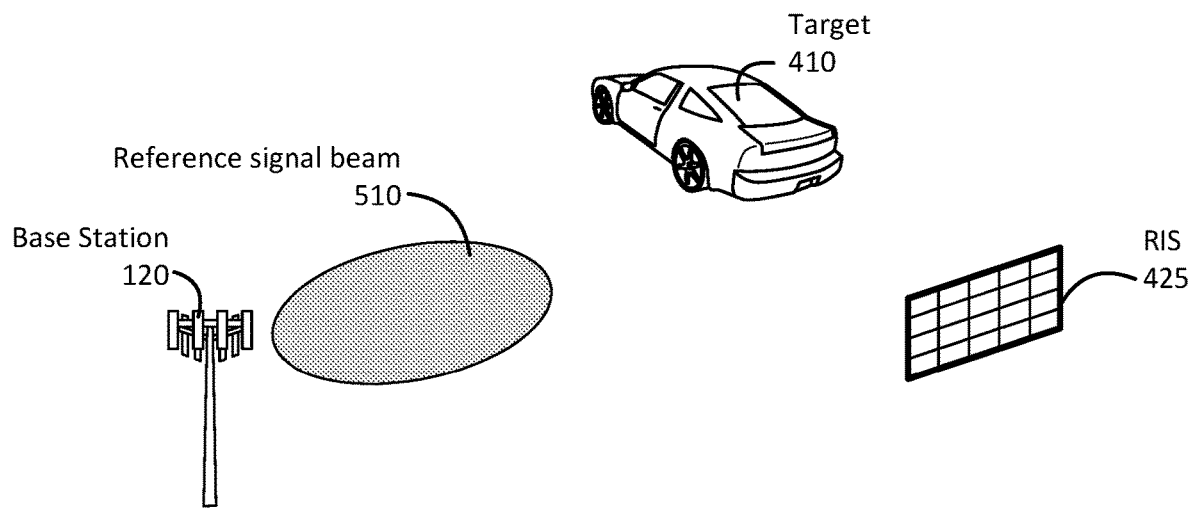
FIGS. 5A and 5B are diagrams of a base station, target, and user equipment (UE), provided to illustrate how beams may be used differently in different embodiments and/or situations, depending on desired functionality.
Figure 5B:
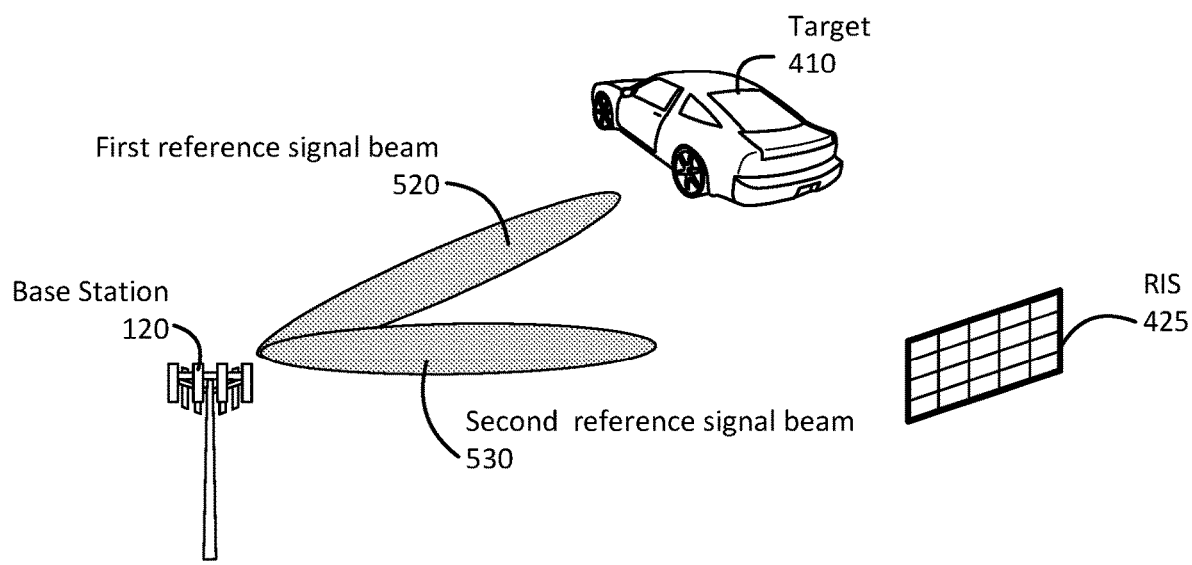

As previously noted, embodiments may use a single reference signal or different reference signals for the radar reference signal 450 and LOS reference signal 460. FIGS. 5A and 5B and the following description provide additional details.

FIGS. 5A and 5B are diagrams of configurations of a base station 120, target 410, and RIS 425 similar the configurations shown in FIGS. 4A and 4B, provided to illustrate how beams may be used differently in different embodiments and/or situations, depending on desired functionality. In FIG. 5A, for example, a single reference signal beam 510 is wide enough to be reflected from the target 410 and received (and redirected to a UE) by the RIS 425, allowing it to be used in the previously-described process for RF sensing of the target 410. As can be seen, whether the reference signal beam 510 is sufficiently wide may depend not only on the width of the reference signal beam, but also how close the target 410 and the RIS 425 are to each other. (In some instances, for example, the target 410 and RIS 425 may be sufficiently close such that a relatively narrow beam—as illustrated in FIG. 5B, for example—may be both reflected from the target 410 and received by the RIS 425.) In FIG. 5B, however, the target 410 is aligned with a first reference signal beam 520, and RIS 425 is more aligned with a second reference signal beam 530. In such instances, even if the RIS 425 is capable of receiving both first reference signal beam 520 and a second reference signal beam 530, it may be preferable for the UE 105 to take a ToA measurement of the second reference signal beam 530, rather than the first reference signal beam 520 (e.g., due to more favorable signal-to-noise (SNR) values to take a ToA measurement).

Figure 6:
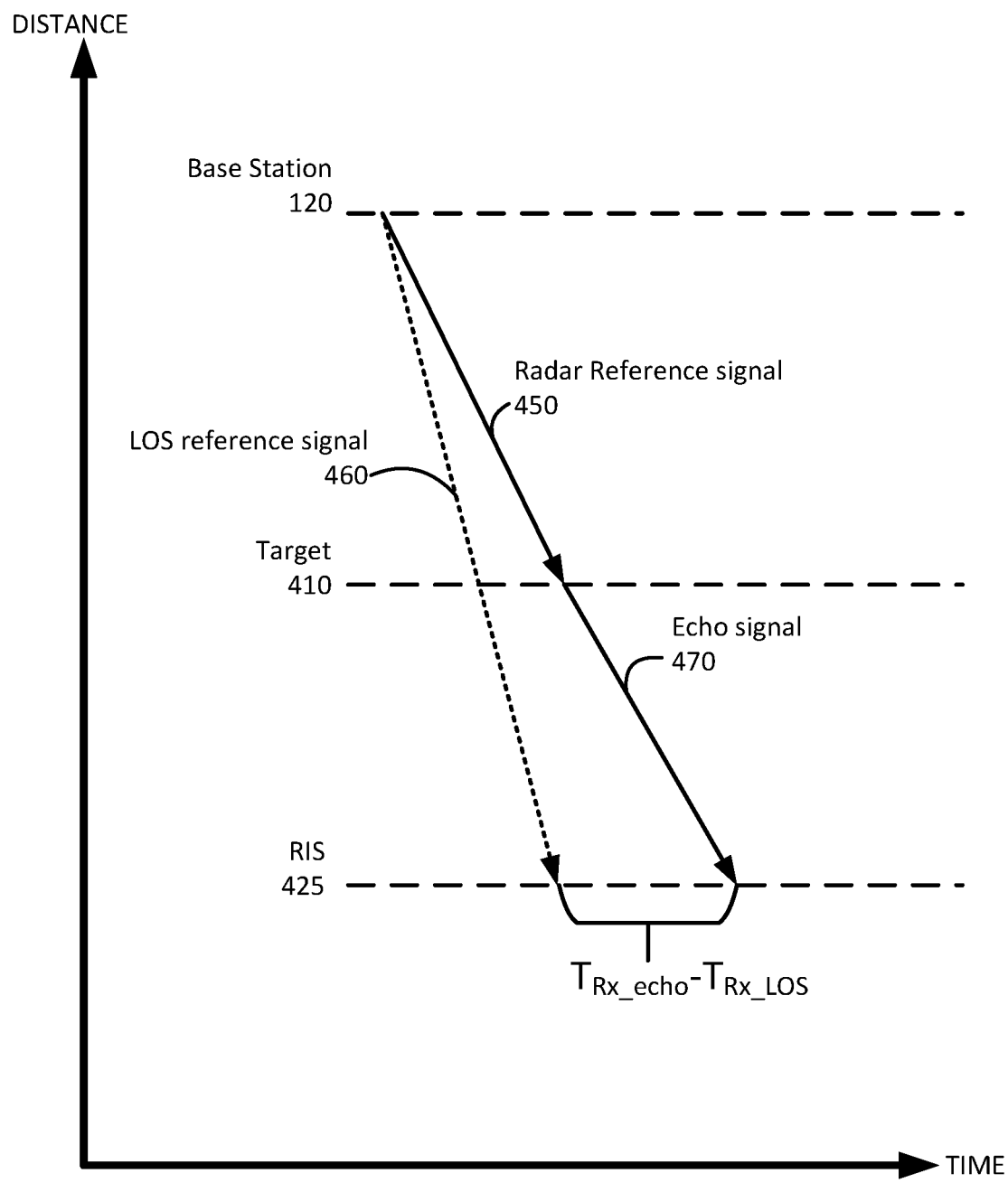
FIGS. 6 and 7 are time-distance diagrams illustrating how timing can be used to determine certain mathematical values related to the configuration shown in FIG. 4A, according to an embodiment.
Figure 7:
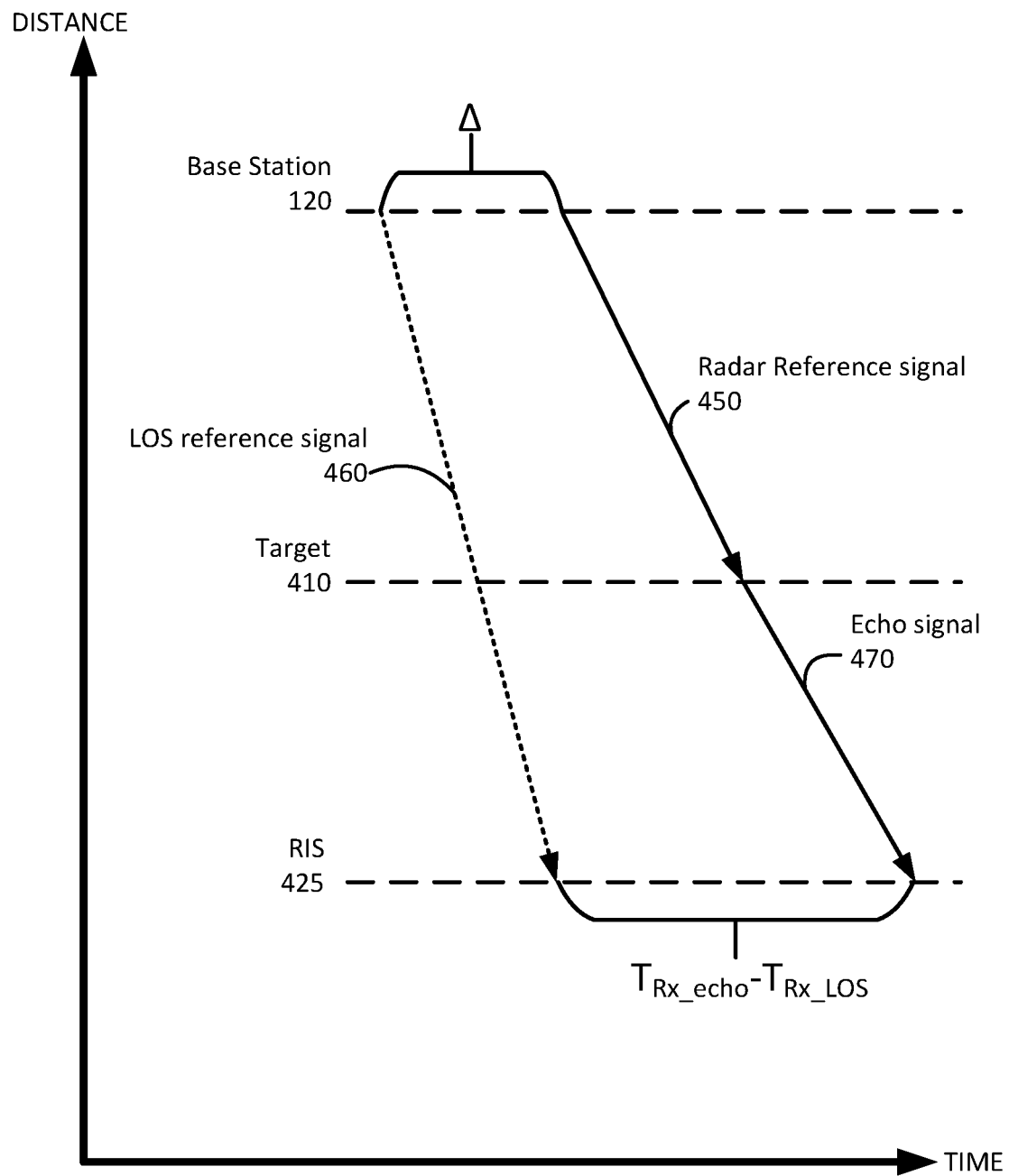

As noted, although reference signals using reference signal beams 520, 530 may be transmitted at different times, because the time difference in the transmission of first reference signal beam 520 and the second reference signal beam 530 is known, this time difference can be accounted for by time gap Δ in equation (3), allowing for the determination of $R_{sum}$ in cases where different reference signal beams transmitted at different times are used. FIGS. 6 and 7 are provided to help illustrate how embodiments may determine $R_{sum}$ when a time gap Δ is or is not present.

FIG. 6 is a time-distance diagram illustrating how timing can be used to determine $R_{sum}$ in the configuration shown in FIG. 4A, according to an embodiment. Here, a base station 120 transmits the LOS reference signal 460 and radar reference signal 450 at the same time. Thus, in this case, the LOS reference signal 460 and radar reference signal 450 may comprise the same signal (e.g., a DL-PRS), which may be transmitted using a single reference signal beam, as illustrated in FIG. 5A. The different angles of reference signals 450 and 460 illustrated in FIG. 5 reflect the different paths of reference signals 450 and 460 in FIG. 4A. Again, reflected echo signal 485 and reflected LOS reference signal 490 from the RIS 425 to the UE 105 travel along the same (or virtually the same) propagation path and therefore experience the same delay. As such, these reflected signals do not impact the $T_{Rx\_echo} - T_{Rx_{LOS}}$ time difference. (Moreover, to avoid clutter in FIGS. 6 and 7, these reflected signals are not illustrated.)

As noted, the location server 160 may coordinate the transmission and measurement of the reference signals 450 and 460 by providing information to the base station 120 regarding how to transmit the reference signals 450 and 460, as well as information to the UE 105 regarding when to measure the reference signals 450 and 460. Further, depending on desired functionality, a single reference beam may be used for the determination of distance $R_{sum}$ as described in relation to FIGS. 4A and 5A.

FIG. 7 is a time-distance diagram, similar to FIG. 6, providing another illustration of how timing can be used to determine $R_{sum}$ in the configuration shown in FIG. 4A, according to an embodiment. In this case, the base station 120 transmits the LOS reference signal 460 and radar reference signal 450 different times: the radar reference signal 450 is transmitted after LOS reference signal 460. As illustrated in FIG. 5B, these reference signals may be transmitted using two beams. A time gap Δ represents the amount of time between the transmission of the radar reference signal 450 and the transmission of LOS reference signal 460. Again, the location server 160 may coordinate the transmission and measurement of the reference signals 450 and 460 by providing information to the base station 120 regarding how to transmit the reference signals 450 and 460, as well as information to the UE 105 regarding when to measure the reference signals 450 and 460. Thus, the time gap Δ may be derived by the UE 105 based on the configuration received from the location server, which may be relayed to the UE 105 by the base station 120.

Figure 8:
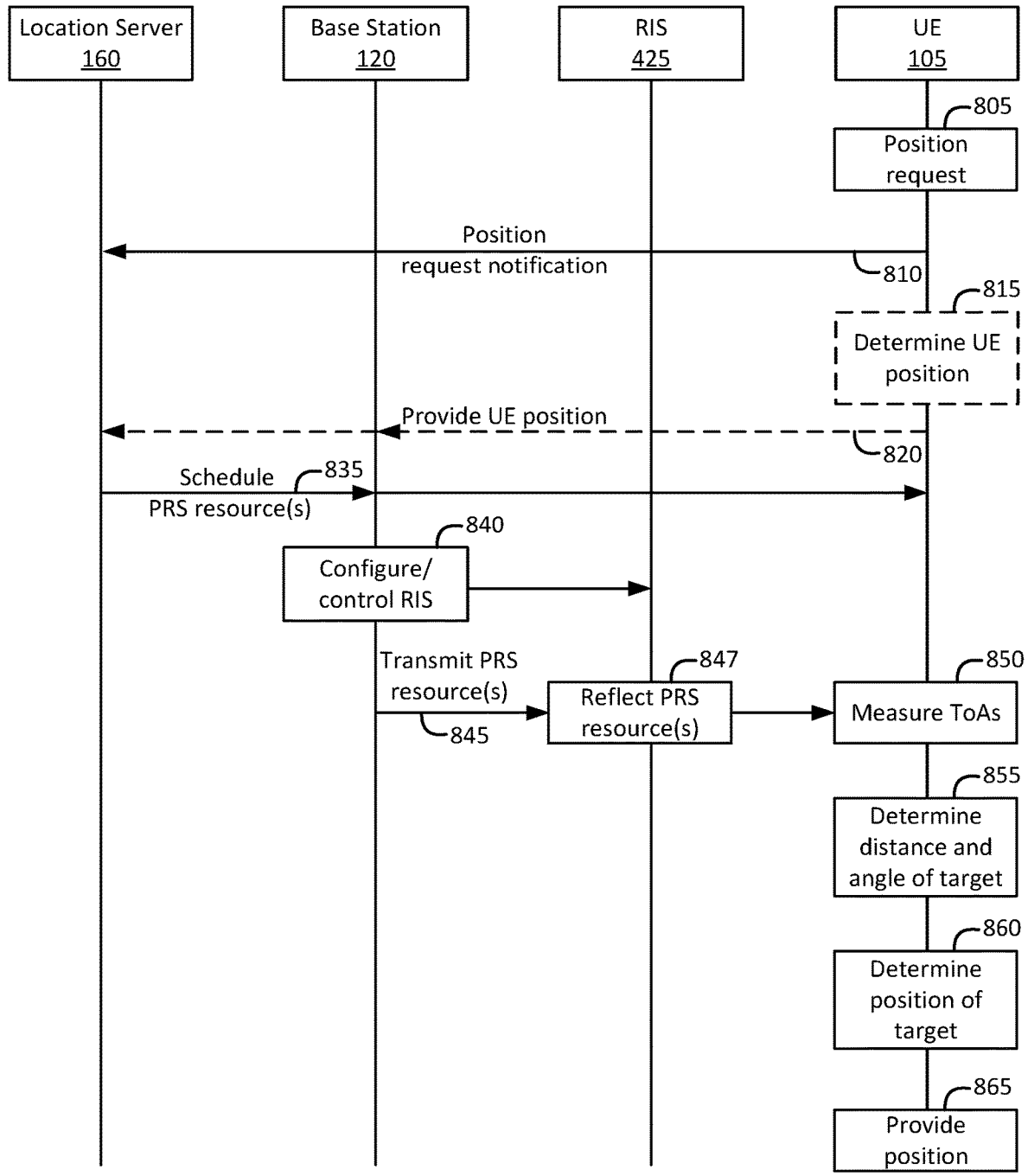
FIGS. 8 and 9 are call-flow diagrams of processes of performing position determination of a target using a RIS, according to some embodiments.
Figure 9:
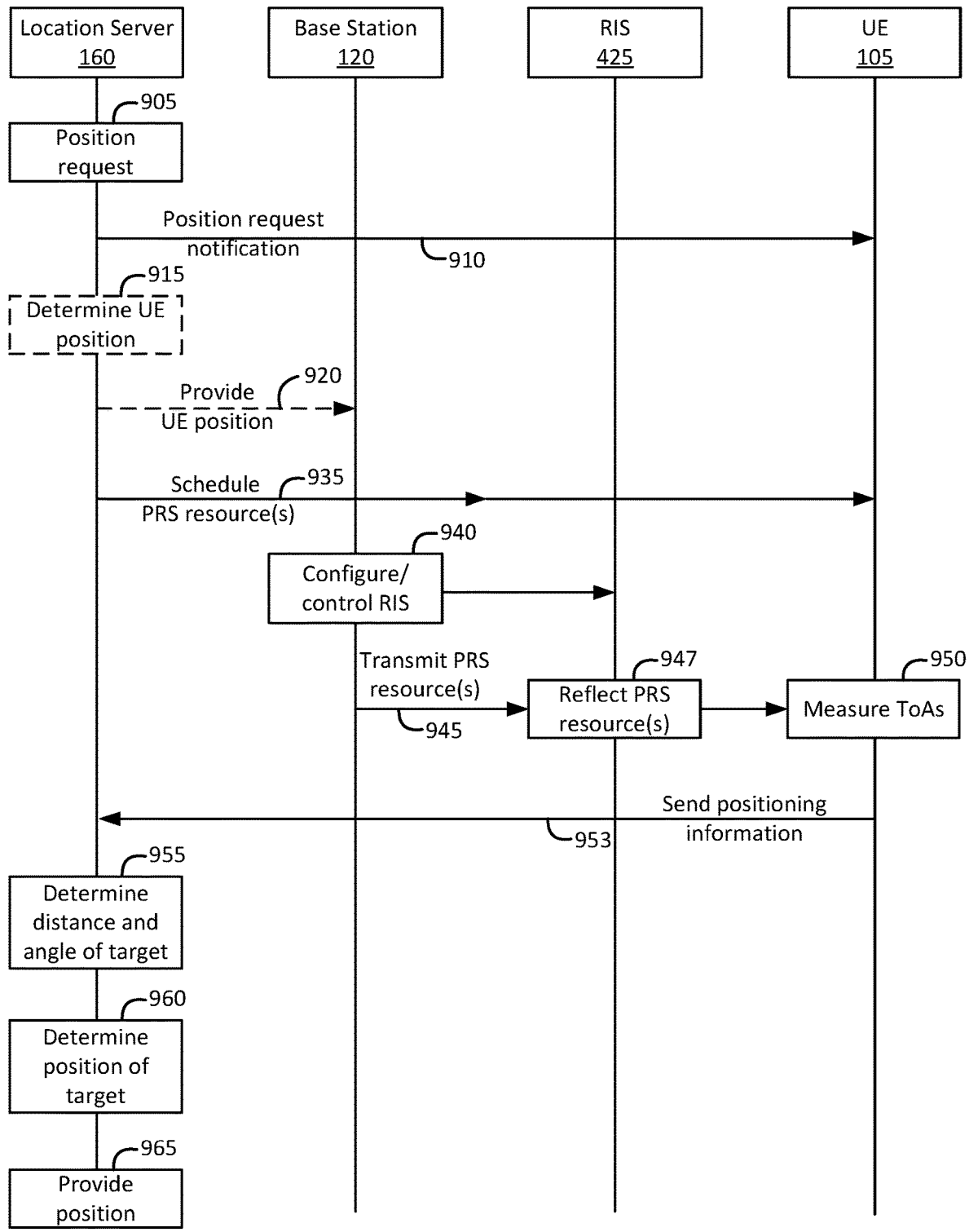

The calculation of the position of the target 410 and/or values distance $R_T$ and angle $\theta_R$ may be performed by different entities, depending on desired functionality. This may depend, for example, on whether a request for the position of the target 410 comes from the UE 105 or whether the request for the position of the target 410 comes from the network or other entity (such as the external client 180 of FIG. 1 or external client 230 of FIG. 2). Accordingly, different processes can be used to determine the position of the target 410. FIGS. 8 and 9 illustrate two example processes. It can be noted, however, that embodiments are not limited to the "positioning" of an object per se. RF sensing in the manner described herein may be conducted to obtain additional or alternative types of information regarding one or more objects/targets (e.g., object detection, identification, movement/object tracking, etc.)

FIG. 8 is a call-flow diagram illustrating an embodiment of a process of performing UE-based (or UE-initiated) RF sensing of a target 410 using an RIS. As with the other figures provided herein, FIG. 8 is provided as a nonlimiting example. As discussed in more detail below, alternative embodiments may perform certain functions in a different order, simultaneously, etc. It can be noted that arrows between the various components illustrated in FIG. 8 illustrate messages or information sent from one component to another. Further (although not explicitly indicated in FIG. 8), communications between the base station 120 and UE 105 may occur using reflection/redirection of communication signals by the RIS 425 in a manner similar to the process illustrated in FIG. 4A (e.g., applying to UL signals from the UE 105 to the base station 120 as well).

With regard to communication between the components illustrated in FIG. 8, it will be understood that there may be any number of intervening devices, servers, etc. that may relay such messages, including other components in FIG. 8. (E.g., a message from the UE 105 to the location server 160 may pass through the base station 120, which may be the serving base station for the UE 105.) Additionally, although wireless reference signals are referred to as PRS resources (e.g., DL-PRS transmitted by the base station 120), alternative embodiments may utilize other wireless reference signal types. As noted, in some embodiments, a radar reference signal (e.g., radar reference signal 450) may be a reference signal specialized to facilitate radar detection, which may be a signal that is not otherwise explicitly defined under 5G (or other 3GPP) standards.

At block 805, the target 410 receives a position request. This position request may come, for example, from an application (or app) executed by the target 410. This may be a result from user interaction with the target 410, based on a determined schedule, or based on other triggers (including user input). Additionally or alternatively, a position request may come from a separate device. In some instances, for example, the target 410 itself may be capable of communicating with the UE 105 and requesting its position. In other instances, however, the target may be unable to communicate and/or otherwise passive.

In response, the target 410 may generate a position request notification. As indicated at arrow 810, the request can be sent to the location server 160, which can coordinate the transmission of the PRS resources (or other reference signals) by the base station 120 to determine of the position of the target 410. According to some embodiments, additional communications between the target 410 and location server 160 may occur to determine capabilities of the target 410 (including, for example, the capability of the UE 105 to detect the location of the target 410). In some embodiments, communication between the location server 160 and target 410 may occur via an LPP positioning session.

At block 815, the UE 105 may optionally determine its position. As noted, the determination of the location of the UE 105 can enable the base station 120 to control the RIS 425 such that the RIS efficiently reflects one or more wireless reference signals and/or other signals for the UE 105. Positioning of the UE 105 be performed in any of a variety of ways, including GNSS and/or other non-network means. Additionally or alternatively, position determination for the UE 105 can be network-based and may involve the location server 160. In such instances, the UE may provide its location to the base station 120 and/or location server 160, as shown by arrow 820.

As indicated by arrow 835, the location server can then schedule the transmission and receipt of PRS resources by the base station 120 and UE 105. More specifically, the scheduling of PRS resources may involve the location server 160 configuring the base station 120 to transmit the one or more PRS resources, and/or the location server 160 or base station 120 configuring the UE 105 to measure the one or more PRS resources.

At block 840, the base station 120 can configure/control the RIS 425 to help ensure subsequently transmitted PRS resources are directed toward the UE 105. This can be informed, according to some embodiments, on a determination of the UE position made at block 815 and provided by the UE 105 at arrow 820. In some embodiments, the location of the UE 105 may be provided directly to the base station 120 by the UE 105, or may be provided by the location server 160. According to some embodiments and/or instances, the base station 120 may already be engaged in controlling the RIS 425 in real time to reflect signals from the base station 120 to the UE 105 (and vice versa) for communication and/or other purposes. In such instances, the base station 120 may not necessarily rely on a determined position of the UE 105 (e.g., as determined at block 815), but may instead rely on techniques used in communication (e.g., CSI-RS/SRS beam selection as previously noted). Alternatively, according to some embodiments, the location server 160 and/or UE 105 may control the RIS 425.

Arrow 845 indicates the base station 120 transmits the one or more PRS resources. As described in the earlier embodiments, the one or more PRS resources may comprise a single RF signal transmitted using a wide beam (e.g., as shown in FIG. 5A) or separate RF signals transmitted using separate names (e.g., as shown in FIG. 5B). In either case, the RIS 425 can reflect the PRS resource(s) to the UE 105, as indicated at block 847, and the UE 105 can measure the ToA of both the PRS resource(s) (e.g., LOS reference signal 460 and echo signal 470). The measurement of these ToAs is shown at block 850. As previously described, the UE 105 may also take an AoA measurement at the RIS 425 of the signal reflected from the target (e.g., echo signal 470) using the reflected reference signal (e.g., reflected echo signal 485) to determine the angle $\theta_R$ of the target.

To help the UE 105 determine the RIS from which PRS resource(s) from the base station 120 are reflected, the base station 120 can include an RIS identifier (e.g., RIS ID) associated with the PRS resource(s). This can be particularly useful where, as described in more detail below, the UE 105 may receive reflected PRS resources from a plurality of RISs 425. In these instances, the base station 120 can reflect PRS resources to different RISs 425 using different beams and different PRS identifiers.

At block 855, the UE 105 determines the distance and angle of the target. This can be done using the processes described above for determining distance ($R_R$) and angle ($\Theta_R$). Again, the angle of the target 410 may be determined using an AoA measurement or using multilateration. In the case of multilateration, additional measurements (e.g. ToA measurements of the echo signal from the PRS resource transmitted at arrow 845, or from another PRS resource) may be obtained from other UEs, or (if the target 410 is static) may be obtained by the UE 105 itself, at different times and in different locations. The distance (or baseline) L between the RIS 425 and base station 120 may be stored at the UE 105 (which the UE 105 may have been previously received from the location server 160 upon entering a region in which the base station 120 and RIS 425 are located). Additionally or alternatively, the location server 160 may provide this distance and/or known locations of the base station 120 and/or RIS 425 as part of the process illustrated in FIG. 8. For example, this position may be provided by the location server 160 to the UE 105 when the location server 160 provides scheduling information at arrow 835. Alternatively, the location server 160 may provide this and a separate message.

At block 860, the UE 105 determines the position of the target 410. This can be done by using equations (1)-(3) in the manner previously described. More specifically, using the angle and distance of the target 410 as determined at block 855, and a known location for the RIS 425, the UE 105 can determine the position of the target 410. This determined position can then be provided by the UE 105, as indicated at block 865.

The way in which the position of the target 410 is provided at block 865 may be dependent on the way in which the position was requested at block 805. If, for example, the position of the target 410 was requested by an application executed at the UE 105, providing the position may therefore comprise providing the position to an application layer (e.g., from a lower layer that determined the position of the target). If requested by a user of the UE 105, the UE 105 can provide the position visibly and/or audibly (e.g., using a display and/or speakers of the UE 105). If the position of the target 410 was requested by the target 410 itself, the UE 105 can communicate the position back to the target 410.

FIG. 9 is call-flow diagram illustrating an embodiment of a process of performing UE-assisted (or network-initiated) RF sensing of a target 410 using an RIS 420. Here, calculations and position determination are performed at the location server 160, based on information received from the UE 105 and target 410. Many of the operations performed in the process of FIG. 9 may be similar to the operations performed in the process of FIG. 8, as previously described.

This process may begin with a position request obtained at the location server 160, as indicated at block 905. As indicated previously, UE-assisted (or network-based) positioning can be based on a request from an external client (e.g., external client 180 of FIG. 1 and/or external client 230 of FIG. 2). Additionally or alternatively, the request may come from a service within the wireless network that may need the position of the target 410 to provide particular functionality.

In response to the position request, the location server 160 may notify the UE 105 of the position request via position request notification, as indicated at arrow 910. In some embodiments, this may comprise initiating a communication session between the location server 160 and UE 105. Among other things, this position request notification at arrow 910 may put the UE 105 on notice, preparing the UE 105 to subsequently take ToA measurements of one or more PRS resources transmitted by the base station 120.

Similar to the process illustrated in FIG. 8, the determination of the UE position may be made at block 915. Here, however, the determination may be made by the location server. To do so, the location server 160 may engage in a positioning session with the UE 105 to determine the location of the UE 105 using network-based positioning. Alternatively, if the UE 105 knows or can obtain its position separate from the network (e.g., using GNSS positioning), the UE 105 may provide its position to the location server 160. This position can be related to the base station 120 as indicated with arrow 920.

Elements 935-950 may be similar to corresponding features in FIG. 8, as previously described.

Once the UE 105 measures the ToAs at block 950, it can send positioning information to the location server 160, as indicated at action 953. This positioning information may comprise the measurements themselves and/or information indicative of a time difference between the ToAs.

Elements 955-965 may be similar to corresponding elements in FIG. 9. The difference in FIG. 9, however, is that these operations are performed at the location server 160. That is, using the positioning information sent by the UE 105 at action 953, the location server can determine the distance and angle of the target 410 and, ultimately, determine the position of the target 410, using the techniques described above or similar thereto. Providing the position of the target 410 at block 965 may comprise communicating the position to a requesting entity (e.g., the entity providing the position request at block 905).

Figure 10:
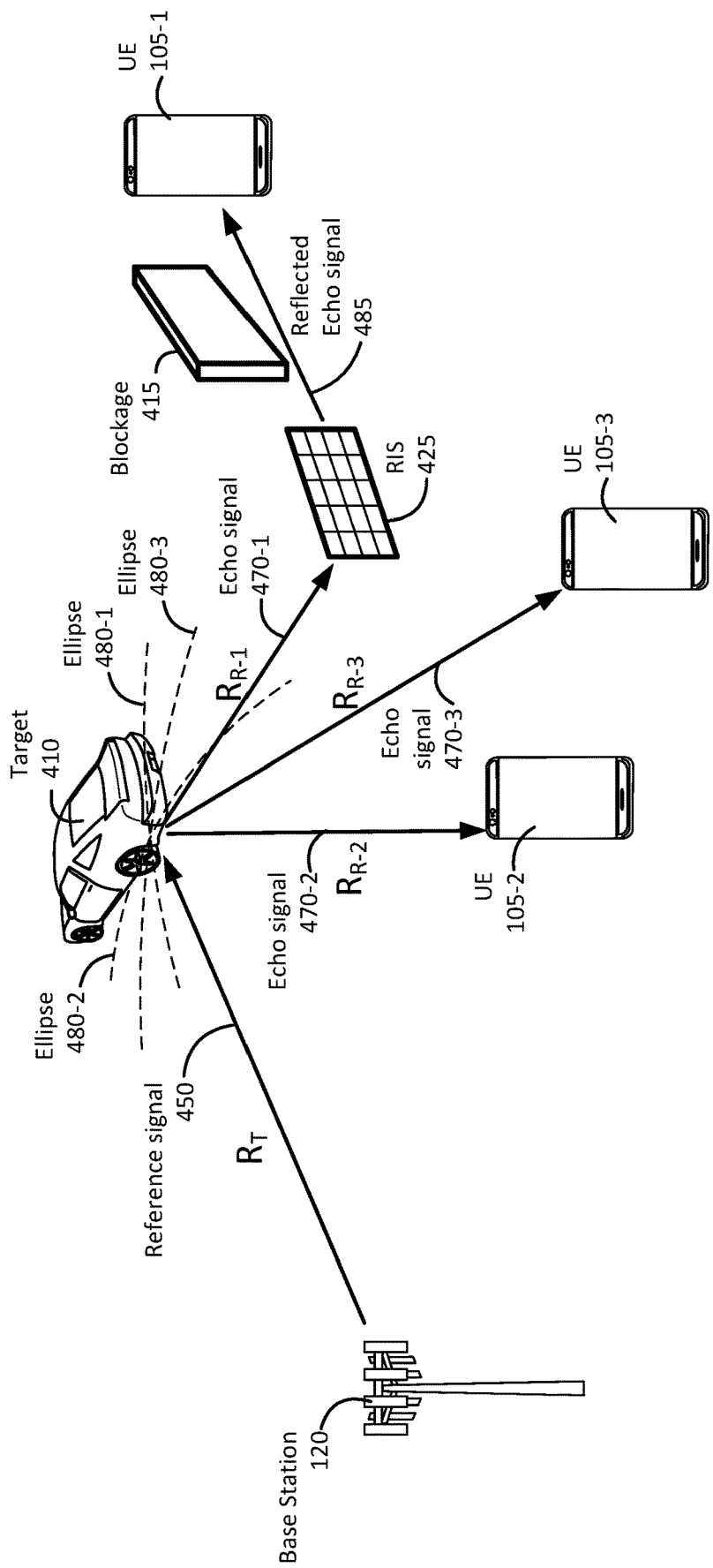
FIG. 10 is a simplified diagram, similar to FIGS. 4A and 4B, illustrating how RF sensing of a target may be performed using a RIS, according to another embodiment.

FIG. 10 is a simplified diagram illustrating a variation to the configuration illustrated in FIG. 4A, which may be performed according to embodiments. Here, rather than a single UE 105, multiple UEs 105-1, 105-2, and 105-3 (collectively and generically referred to herein simply as UEs 105) are used. Again, embodiments are not so limited, and receiving devices may comprise any number of devices, including devices and/or device types in addition or alternative to UEs 105. To reduce clutter, the location server 160 has been removed from FIG. 10, although, as indicated below, a location server 160 may be used in a manner similar to the manner described with respect to FIG. 4A. Furthermore, as previously noted, in addition to RIS 425 directing signals from the target 410 and base station 120 to a first UE 105-1, the RIS 425 and/or other RISs (not shown) may direct similar signals to other UEs (e.g., UE 105-2 and/or UE 105-3). Additionally or alternatively, according to some embodiments, multiple RISs 425 may forward signals to a single UE 105.

The process of determining the location of the target 410 may be generally similar to the process illustrated in FIG. 4A and described in conjunction with FIGS. 4A-9. However, because multiple UEs 105 are used, angle information may not be needed. That is, rather than (or in addition to) determining the position of the target 410 using distance $R_R$ and angle $\theta_R$, the position may be determined instead using multi-lateration. To do so, each UE 105 may receive a respective echo signal 470 from the target 410, as well as a direct reference signal from the base station 120 (similar to LOS reference signal 460 in FIG. 4A) to determine a respective determine $R_{sum}$ using equation (3). (To reduce clutter, direct reference signals are not illustrated in FIG. 10.) Because $R_{sum}$ is the sum of $R_T$ and the respective $R_R$ for the RIS 425, the value of $R_{sum}$ can be used to form a respective ellipse 480-1 for RIS 425. A similar calculation of $R_{sum}$ may be made for each other UE (105-2 and 105-3), resulting in corresponding ellipses 480-2 and 480-3. For each ellipse, the base station 120 and RIS 425 or UE 105 are foci of the respective ellipse. (Again, to reduce clutter, only applicable portions of ellipses 480 are illustrated in FIG. 10) The device determining the location of the target 410 (e.g., any/all of the UEs 105 and/or the location server 160 (not illustrated in FIG. 10)) may do so by determining the point at which the ellipses 480 converge. As such, no AoA or other angular determinations may be needed to determine the location of the target 410.

The number of UEs 105 (or other receiving devices) used to determine the position of the target 410 in this manner may vary, depending on the situation. A larger or smaller number of UEs 105 than illustrated in FIG. 10, for example, can be used. In some circumstances, such as when two UEs 105 are used, there may be ambiguities (e.g., multiple convergence points) in the position of the target 410. In such instances, other data can be leveraged to resolve the ambiguities. This other data can include, for example, tracking information for the target 410, other (previous and/or simultaneous) position determinations for the target 410, or the like. As previously noted, multiple RISs 425 may direct signals toward a single UE 105. In such instances, the multiple RISs can be used in addition or as an alternative to multiple UEs 105, and an ellipse may be calculated for each RIS 425 and multilateration is performed based on ellipses from multiple RISs 425. (As noted previously, an RIS ID may be included in and/or associated with wireless reference signals transmitted by the base station 120, enabling a UE 105 receiving redirected signals from multiple RISs 425 to separately determine a corresponding ellipse for each.)

It can be noted that embodiments for determining the location of the target 410 in the manner illustrated in FIG. 10 may follow a similar process as those illustrated in FIGS. 8-9. Because multiple UEs 105 are used, the functionality of the UE 105 illustrated in FIGS. 8-9 may be replicated for all UEs 105. That said, the determination of the position of the target at block 860 of FIG. 8 may be performed by a single UE 105, if desired. To do so, the UE 105 may perform multilateration calculations based on positioning information (e.g., ToA measurements and/or time-difference determinations) received from the other UEs. This information may be received directly from the other UEs (e.g., using sidelink communications) or indirectly via the location server 160 and/or base station 120.

Figure 11:
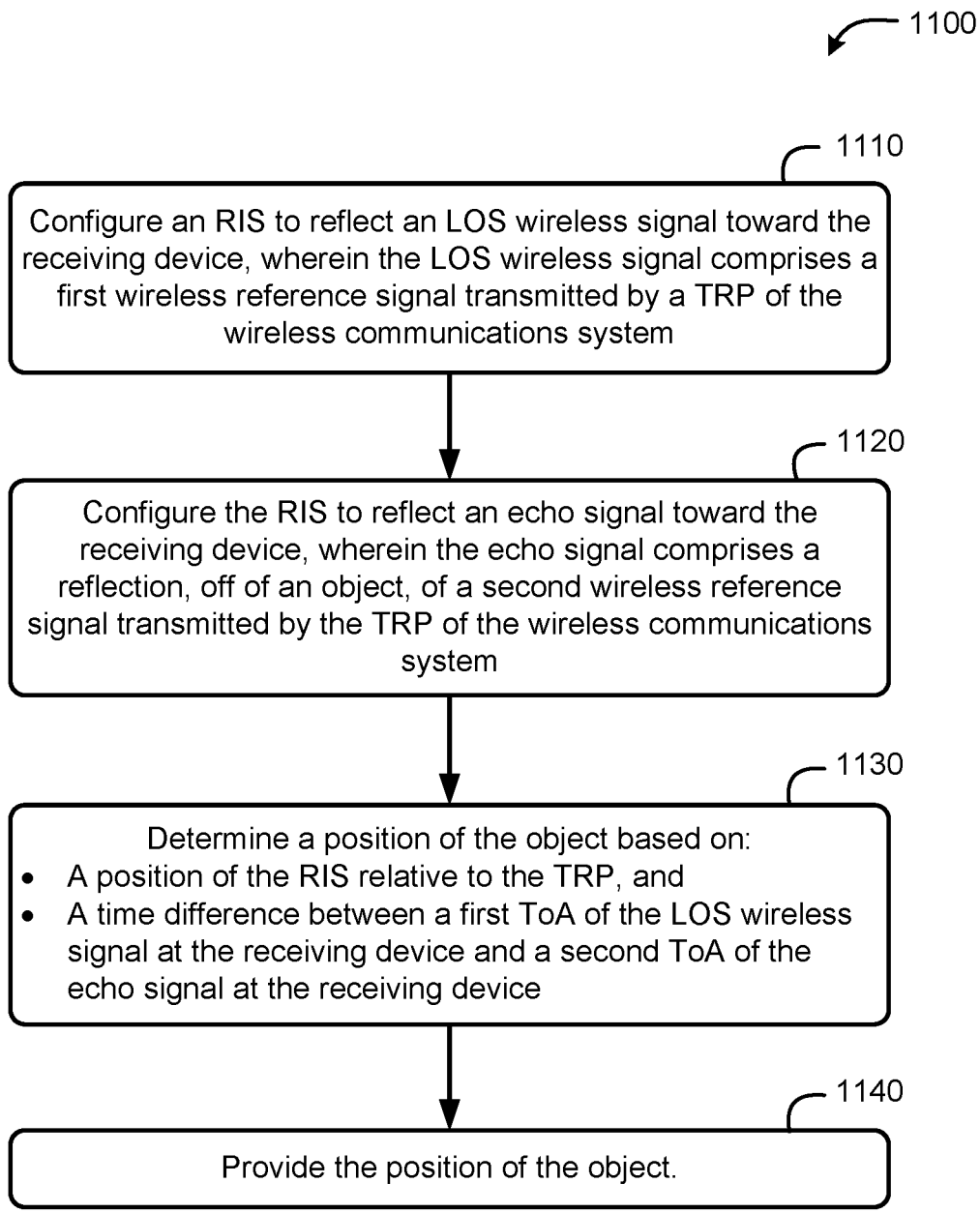
FIG. 11 is a flow diagram of a method of performing RF sensing, according to some embodiments.

FIG. 11 is a flow diagram of a method 1100 of performing RF sensing with a receiving device and an RIS in a wireless communication network, according to an embodiment. Here, the receiving device may correspond with the UE 105 and the RIS may correspond with RIS 425, as described in FIGS. 4A-10. Depending on desired functionality, the various operations illustrated in FIG. 11 may correspond with functionality of an RIS, UE, base station, or location server as taught in the previously-described embodiments. Therefore, aspects of the method 1100 may correspond to the functionality of different components described with regard to FIGS. 8-9. Means for performing the functionality illustrated in one or more of the blocks shown in FIG. 11 may be performed by hardware and/or software components of a receiving device or computer system. Example components of a receiving device or computer system are respectively illustrated in FIGS. 12 and 13, which are described in more detail below.

At block 1110, the functionality comprises configuring the RIS to reflect an LOS wireless signal toward the receiving device, wherein the LOS wireless signal comprises a first wireless reference signal transmitted by a TRP of the wireless communications system. As described in the embodiments above, the TRP may comprise a base station (including a gNB or eNB, for example). Where the network entity comprises a base station or TRP, the wireless reference signals may comprise a downlink (DL) reference signal such as a PRS, SSB, Tracking Reference Signal (TRS), Channel State Information Reference Signal (CSIRS), Demodulation Reference Signal (DMRS), or the like.

According to some embodiments, the operations illustrated in FIG. 11 may be performed in response to a request at the receiving device for the position of an object or target. As indicated with arrow 810 of FIG. 8, the receiving device can then respond by sending a position request to the location server 160. Accordingly, some embodiments of the method 1100 may comprise, prior to receiving the configuration from the server, sending a request to the server to perform the RF sensing.

As indicated in the above-described embodiments, the RIS may reflect the LOS wireless signal toward the receiving device based on a configuration or control by another device. For example, the configuration/control may be provided by the TRP (e.g., base station), the receiving device (e.g., UE), or a server (e.g., location server) communicatively coupled with the RIS. This can be provided directly to the RIS from the TRP or receiving device, or indirectly from the server or receiving device via the TRP. As noted, the direction with which the RIS reflects the LOS wireless signal (e.g., a beam of the reflected LOS wireless signal) may be informed by a position of the receiving device. This can help increase efficiency and reduce the likelihood of multi path.

Figure 12:
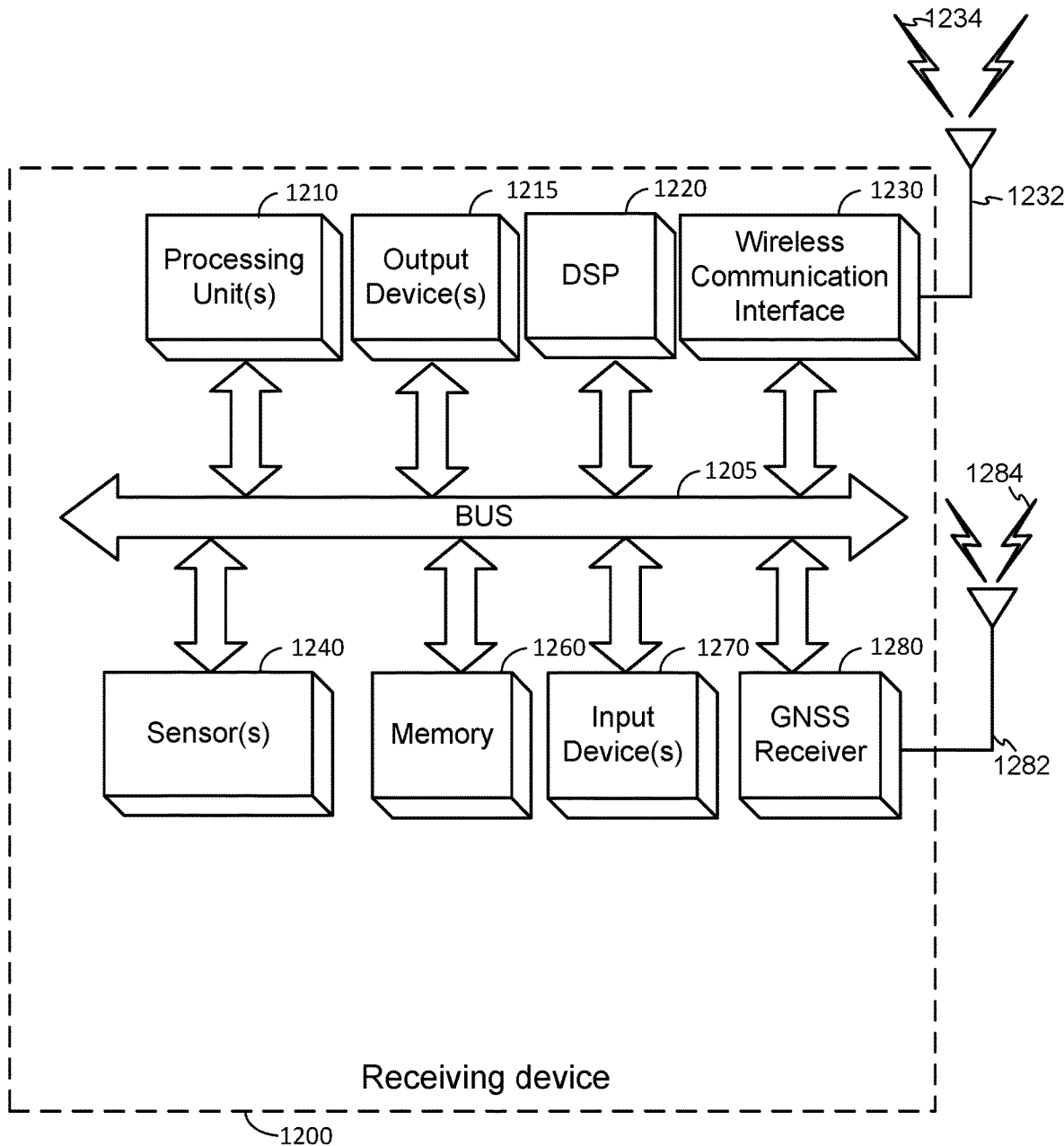
FIG. 12 is a block diagram of an embodiment of a receiving device, which can be utilized in embodiments as described herein.
Figure 13:
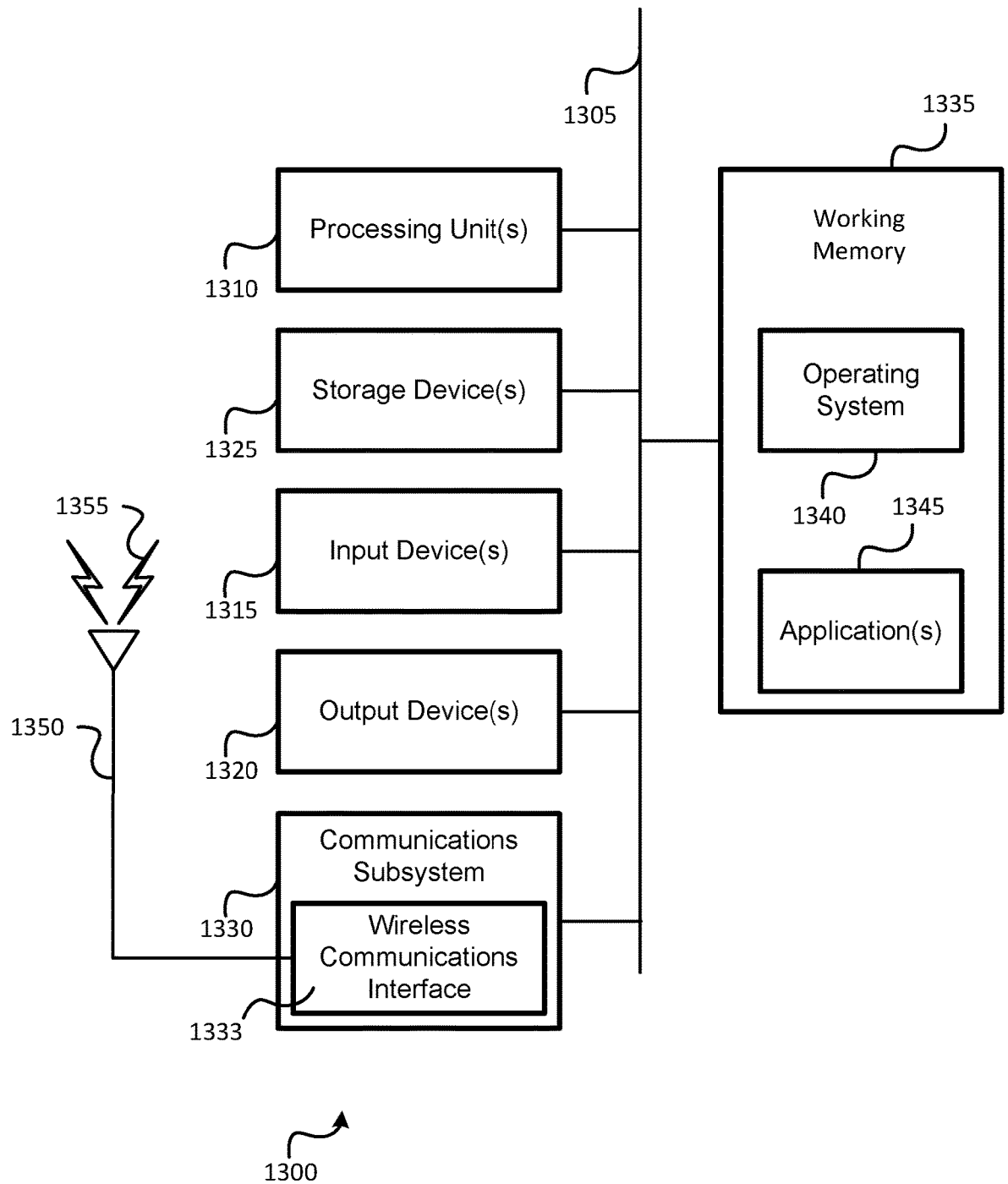
FIG. 13 is a block diagram of an embodiment of a computer system, which can be utilized in embodiments as described herein.

Means for performing functionality at block 1110 may comprise a bus 1205, wireless communication interface 1230, digital signal processor (DSP) 1220, processing unit(s) 1210, memory 1260, and/or other components of a receiving device 1200, as illustrated in FIG. 12. Additionally or alternatively, means for performing functionality at block 1110 may comprise a bus 1305, communications subsystem 1330, processing unit(s) 1310, working memory 1335, and/or other components of a computer system 1300, as illustrated in FIG. 13.

At block 1120, the functionality comprises configuring the RIS to reflect an echo signal toward the receiving device, wherein the echo signal comprises a reflection, off of an object, of a second wireless reference signal transmitted by the TRP of the wireless communications system. Here, reflecting the echo signal may be substantially similar to reflecting the LOS wireless signal at block 1110, although the location of the sources of the signals (the TRP and object) may be different. According to some embodiments, the RIS may also be configured to adjust a phase, a magnitude, or both of either or both the LOS wireless signal or the echo signal. That is, the RIS may, when reflecting either or both the LOS wireless signal or the echo signal, adjust the phase (and/or amplitude) to provide a watermark, as discussed with regard to FIG. 4B.

Means for performing functionality at block 1120 may comprise a bus 1205, wireless communication interface 1230, digital signal processor (DSP) 1220, processing unit(s) 1210, memory 1260, and/or other components of a receiving device 1200, as illustrated in FIG. 12. Additionally or alternatively, means for performing functionality at block 1120 may comprise a bus 1305, communications subsystem 1330, processing unit(s) 1310, working memory 1335, and/or other components of a computer system 1300, as illustrated in FIG. 13.

At block 1130, the functionality comprises determining a position of the object based on (i) a position of the RIS relative to the TRP, and (ii) a time difference between a first ToA of the LOS wireless signal at the receiving device and a second ToA of the echo signal at the receiving device. As illustrated in the embodiments above, the position of the RIS relative to the TRP may comprise a distance L used to determine $R_{sum}$ and ultimately $R_R$. According to some embodiments, this distance may be determined by a location server or receiving device and may be derived from known positions of the TRP and RIS. These locations may be stored in an almanac or index of such network entities may be accessed and/or maintained by the location server, and further may be provided to the receiving device.

Means for performing functionality at block 1130 may comprise a bus 1205, wireless communication interface 1230, digital signal processor (DSP) 1220, processing unit(s) 1210, memory 1260, and/or other components of a receiving device 1200, as illustrated in FIG. 12. Additionally or alternatively, means for performing functionality at block 1130 may comprise a bus 1305, communications subsystem 1330, processing unit(s) 1310, working memory 1335, and/or other components of a computer system 1300, as illustrated in FIG. 13.

At block 1140, the functionality comprises providing the position of the object with the receiving device. As previously noted, the way in which the position is provided can vary depending on circumstance. According to some embodiments, the determination of the position of the object may be carried out using a specialized application or lower-level function, in which case providing the position of the object may comprise providing the position of the object to an application executed by the receiving device.

Means for performing functionality at block 1140 may comprise a bus 1205, wireless communication interface 1230, digital signal processor (DSP) 1220, processing unit(s) 1210, memory 1260, and/or other components of a receiving device 1200, as illustrated in FIG. 12. Additionally or alternatively, means for performing functionality at block 1140 may comprise a bus 1305, communications subsystem 1330, processing unit(s) 1310, working memory 1335, and/or other components of a computer system 1300, as illustrated in FIG. 13.

As discussed in the above-described embodiments, additional operations may be performed, depending on desired functionality. For example, according to some embodiments of the method 1100, configuring the RIS to reflect the LOS wireless signal and the echo signal toward the receiving device may comprise, in part, controlling the RIS with the TRP or a server. In embodiments where the server controls the RIS, the server may further determine a position of the receiving device and configure the RIS to reflect the LOS wireless signal and the echo signal toward the receiving device based on the position of the receiving device. As noted, the determining of the position of the receiving device may be performed by the server (e.g., using network-based positioning techniques) or may be performed by the receiving device, which may provide the server with the determined position information.

As noted, and RIS identifier may be used to identify the RIS that reflects the LOS and/or echo signals. This can be particularly useful if multiple RISs are used in the detection/positioning of an object. As such, some embodiments of the method 1100 may comprise including, in the first wireless reference signal and the second wireless reference signal, an identifier of the RIS.

Other embodiments may include additional or alternative variations. According to some embodiments, for example, the receiving device may comprise a mobile device or another TRP. According to some embodiments, the receiving device may determine the position of the object. This determination may be performed in different ways, depending on desired functionality. For example, according to some embodiments, the method 1100 further comprises determining, with the receiving device, a receive angle comprising an angle at which the echo signal is received at the RIS, and wherein the receiving device determines the position of the object additionally based on the receive angle. According to some embodiments, the method 1100 may further comprise determining, with the receiving device, a time gap comprising a difference between a time the TRP transmits the first wireless reference signal and a time the TRP transmits the second wireless reference signal, wherein determining the position of the object is further based on the time gap. According to some embodiments, determining the time gap may comprise receiving an indication of the time gap from a server. In embodiments in which the receiving device determines the position of the object, providing the position of the object may comprise providing the position of the object to an application executed by the receiving device. Additionally or alternatively, the method 1100 may comprise sending information indicative of the position of the RIS relative to the TRP from a server to the receiving device.

According to some embodiments, the server may determine the position of the object. Such embodiments may further comprise receiving, at the server, information indicative of the first ToA and the second ToA from the receiving device and determining, with the server, the time difference between the first ToA and the second ToA from the information indicative of the first ToA and the second ToA. The information indicative of the first ToA and the second ToA comprises a time difference between the ToAs. According to some embodiments, the method 1100 may further comprise determining with the server based on multilateration from information received from a plurality of receiving devices, a receive angle comprising angle at which the echo signal is received at the RIS. In such embodiments, the server may determine the position of the object additionally based on the receive angle. Additionally or alternatively, embodiments may comprise determining, with the server, a time gap comprising a difference between a time the TRP transmits the first wireless reference signal and a time the TRP transmits the second wireless reference signal, wherein determining the position of the object is further based on the time gap.

FIG. 12 is a block diagram of an embodiment of a receiving device 1200, which can be utilized as a target, UE, or other UE as described herein above (e.g., in association with FIGS. 1-11). For example, the receiving device 1200 can perform one or more of the functions of the method shown in FIG. 11. It should be noted that FIG. 12 is meant only to provide a generalized illustration of various components, any or all of which may be utilized as appropriate. It can be noted that, in some instances, components illustrated by FIG. 12 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 12.

The receiving device 1200 is shown comprising hardware elements that can be electrically coupled via a bus 1205 (or may otherwise be in communication, as appropriate). The hardware elements may include a processing unit(s) 1210 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. As shown in FIG. 12, some embodiments may have a separate DSP 1220, depending on desired functionality. Location determination and/or other determinations based on wireless communication may be provided in the processing unit(s) 1210 and/or wireless communication interface 1230 (discussed below). The receiving device 1200 also can include one or more input devices 1270, which can include without limitation one or more keyboards, touch screens, touch pads, microphones, buttons, dials, switches, and/or the like; and one or more output devices 1215, which can include without limitation one or more displays (e.g., touch screens), light emitting diodes (LEDs), speakers, and/or the like.

The receiving device 1200 may also include a wireless communication interface 1230, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the receiving device 1200 to communicate with other devices as described in the embodiments above. The wireless communication interface 1230 may permit data and signaling to be communicated (e.g., transmitted and received) with TRPs of a network (e.g., including eNBs, gNBs, ng-eNBs), access points, various base stations and/or other access node types, and/or other network components, computer systems, and/or any other electronic devices (UEs/mobile devices, etc.) communicatively coupled with TRPs, as described herein. The communication can be carried out via one or more wireless communication antenna(s) 1232 that send and/or receive wireless signals 1234. According to some embodiments, the wireless communication antenna(s) 1232 may comprise a plurality of discrete antennas, antenna arrays, or any combination thereof. The antenna(s) 1232 may be capable of transmitting and receiving wireless signals using beams (e.g., Tx beams and Rx beams). Beam formation may be performed using digital and/or analog beam formation techniques, with respective digital and/or analog circuitry. The wireless communication interface 1230 may include such circuitry.

Depending on desired functionality, the wireless communication interface 1230 may comprise a separate receiver and transmitter, or any combination of transceivers, transmitters, and/or receivers to communicate with TRPs (e.g., ng-eNBs and gNBs) and other terrestrial transceivers, such as wireless devices and access points. The receiving device 1200 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The receiving device 1200 can further include sensor(s) 1240. Sensors 1240 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the receiving device 1200 may also include a Global Navigation Satellite System (GNSS) receiver 1280 capable of receiving signals 1284 from one or more GNSS satellites using an antenna 1282 (which could be the same as antenna 1232). Positioning based on GNSS signal measurement can be utilized to complement and/or incorporate the techniques described herein. The GNSS receiver 1280 can extract a position of the receiving device 1200, using conventional techniques, from GNSS satellites 110 of a GNSS system, such as Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 1280 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1280 is illustrated in FIG. 12 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 1210, DSP 1220, and/or a processing unit within the wireless communication interface 1230 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 1210 or DSP 1220.

The receiving device 1200 may further include and/or be in communication with a memory 1260. The memory 1260 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1260 of the receiving device 1200 also can comprise software elements (not shown in FIG. 12), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1260 that are executable by the receiving device 1200 (and/or processing unit(s) 1210 or DSP 1220 within receiving device 1200). In an aspect, then such code and/or instructions can be used to configure and/or adapt a general-purpose computer (or other device) to perform one or more operations in accordance with the described methods.

FIG. 13 is a block diagram of an embodiment of a computer system 1300, which may be used, in whole or in part, to provide the functions of one or more network components as described in the embodiments herein (e.g., location server 160 of FIGS. 1, 4, 8, and 9). It should be noted that FIG. 13 is meant only to provide a generalized illustration of various components, any or all of which may be utilized as appropriate. FIG. 13, therefore, broadly illustrates how individual system elements may be implemented in a relatively separated or relatively more integrated manner. In addition, it can be noted that components illustrated by FIG. 13 can be localized to a single device and/or distributed among various networked devices, which may be disposed at different geographical locations.

The computer system 1300 is shown comprising hardware elements that can be electrically coupled via a bus 1305 (or may otherwise be in communication, as appropriate). The hardware elements may include processing unit(s) 1310, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1300 also may comprise one or more input devices 1315, which may comprise without limitation a mouse, a keyboard, a camera, a microphone, and/or the like; and one or more output devices 1320, which may comprise without limitation a display device, a printer, and/or the like.

The computer system 1300 may further include (and/or be in communication with) one or more non-transitory storage devices 1325, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1300 may also include a communications subsystem 1330, which may comprise wireless communication technologies managed and controlled by a wireless communication interface 1333, as well as wired technologies (such as Ethernet, coaxial communications, universal serial bus (USB), and the like). The wireless communication interface 1333 may comprise one or more wireless transceiver that may send and receive wireless signals 1355 (e.g., signals according to 5G NR or LTE) via wireless antenna(s) 1350. Thus the communications subsystem 1330 may comprise a modem, a network card (wireless or wired), an infrared communication device, a wireless communication device, and/or a chipset, and/or the like, which may enable the computer system 1300 to communicate on any or all of the communication networks described herein to any device on the respective network, including a UE/mobile device, base stations and/or other TRPs, and/or any other electronic devices described herein. Hence, the communications subsystem 1330 may be used to receive and send data as described in the embodiments herein.

In many embodiments, the computer system 1300 will further comprise a working memory 1335, which may comprise a RAM or ROM device, as described above. Software elements, shown as being located within the working memory 1335, may comprise an operating system 1340, device drivers, executable libraries, and/or other code, such as one or more applications 1345, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1325 described above. In some cases, the storage medium might be incorporated within a computer system, such as computer system 1300. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1300 and/or might take the form of source and/or installable code, which, upon compilation and/or installation on the computer system 1300 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of performing radio frequency (RF) sensing with a receiving device and a reconfigurable intelligent surface (RIS) in a wireless communications system, the method comprising: configuring the RIS to reflect a Line-Of-Sight (LOS) wireless signal toward the receiving device, wherein the LOS wireless signal comprises a first wireless reference signal transmitted by a Transmission Reception Point (TRP) of the wireless communications system; configuring the RIS to reflect an echo signal toward the receiving device, wherein the echo signal comprises a reflection, off of an object, of a second wireless reference signal transmitted by the TRP of the wireless communications system; determining a position of the object based on: a position of the RIS relative to the TRP, and a time difference between a first Time of Arrival (ToA) of the LOS wireless signal at the receiving device and a second ToA of the echo signal at the receiving device; and providing the position of the object.

Clause 2. The method of clause 1, wherein configuring the RIS to reflect the LOS wireless signal and the echo signal toward the receiving device comprises controlling the RIS with the TRP or a server.

Clause 3. The method of clause 1 or 2, wherein the server controls the RIS, and wherein the server further: determines a position of the receiving device; and configures the RIS to reflect the LOS wireless signal and the echo signal toward the receiving device based on the position of the receiving device.

Clause 4. The method of any of clauses 1-3, further comprising including, in the first wireless reference signal and the second wireless reference signal, an identifier of the RIS.

Clause 5. The method of any of clauses 1-4, wherein the receiving device comprises a mobile device or another TRP.

Clause 6. The method of any of clauses 1-5, wherein the receiving device determines the position of the object.

Clause 7. The method of any of clauses 1-6, further comprising determining, with the receiving device, a receive angle comprising an angle at which the echo signal is received at the RIS, and wherein the receiving device determines the position of the object additionally based on the receive angle.

Clause 8. The method of any of clauses 1-7, further comprising determining, with the receiving device, a time gap comprising a difference between a time the TRP transmits the first wireless reference signal and a time the TRP transmits the second wireless reference signal, wherein determining the position of the object is further based on the time gap.

Clause 9. The method of any of clauses 1-8, wherein determining the time gap comprises receiving an indication of the time gap from a server.

Clause 10. The method of any of clauses 1-9, wherein providing the position of the object comprises providing the position of the object to an application executed by the receiving device.

Clause 11. The method of any of clauses 1-10, further comprising sending information indicative of the position of the RIS relative to the TRP from a server to the receiving device.

Clause 12. The method of any of clauses 1-5, wherein a server determines the position of the object.

Clause 13. The method of any of clauses 1-5 or 12, further comprising: receiving, at the server, information indicative of the first ToA and the second ToA from the receiving device; and determining, with the server, the time difference between the first ToA and the second ToA from the information indicative of the first ToA and the second ToA.

Clause 14. The method of any of clauses 1-5, 12 or 13, further comprising:
determining, with the server based on multilateration from information received from a plurality of receiving devices, a receive angle comprising angle at which the echo signal is received at the RIS; wherein the server determines the position of the object additionally based on the receive angle.

Clause 15. The method of any of clauses 1-5 or 12-14, further comprising determining, with the server, a time gap comprising a difference between a time the TRP transmits the first wireless reference signal and a time the TRP transmits the second wireless reference signal, wherein determining the position of the object is further based on the time gap.

Clause 16. The method of any of clauses 1-15, further comprising configuring the RIS to adjust a phase, a magnitude, or both of either or both the LOS wireless signal or the echo signal.

Clause 17. A device comprising: a transceiver; a memory; and one or more processing units communicatively coupled with the transceiver and the memory, the one or more processing units configured to: configure a reconfigurable intelligent surface (RIS) to a Line-Of-Sight (LOS) wireless signal toward a receiving device, wherein the LOS wireless signal comprises a first wireless reference signal transmitted by a Transmission Reception Point (TRP) of a wireless communications system; configure the RIS to reflect an echo signal toward the receiving device, wherein the echo signal comprises a reflection, off of an object, of a second wireless reference signal transmitted by the TRP of the wireless communications system; determine a position of the object based on: a position of the RIS relative to the TRP, and a time difference between a first Time of Arrival (ToA) of the LOS wireless signal at the receiving device and a second ToA of the echo signal at the receiving device; and provide the position of the object.

Clause 17. The device of clause 17, wherein: the device comprises the TRP or a server; and to configure the RIS to reflect the LOS wireless signal and the echo signal toward the receiving device, the one or more processing units are configured to control the RIS via the transceiver.

Clause 19. The device of clause 17 or 18, wherein the device comprises the server, and wherein the one or more processing units are further configured to: determine a position of the receiving device; and configure the RIS to reflect the LOS wireless signal and the echo signal toward the receiving device based on the position of the receiving device.

Clause 20. The device of any of clauses 17-19, wherein the one or more processing units are further configured to include, in the first wireless reference signal and the second wireless reference signal, an identifier of the RIS.

Clause 21. The device of any of clauses 17-20, wherein the receiving device comprises a mobile device or another TRP.

Clause 22. The device of any of clauses 17-21, wherein the device comprises the receiving device.

Clause 23. The device of any of clauses 17-22, wherein the one or more processing units are further configured to determine a receive angle comprising an angle at which the echo signal is received at the RIS, and wherein the one or more processing units are configured to determine the position of the object additionally based on the receive angle.

Clause 24. The device of any of clauses 17-23, wherein the one or more processing units are further configured to determine a time gap comprising a difference between a time the TRP transmits the first wireless reference signal and a time the TRP transmits the second wireless reference signal, and wherein the one or more processing units are configured to determine the position of the object is further based on the time gap.

Clause 25. The device of any of clauses 17-24, wherein, to determine the time gap, the one or more processing units are configured to receive an indication of the time gap from a server.

Clause 26. The device of any of clauses 17-25, wherein, to provide the position of the object, the one or more processing units are configured to provide the position of the object to an application executed by the receiving device.

Clause 27. The device of clause any of clauses 17-26, wherein the one or more processing units are configured to receive, via the transceiver, information indicative of the position of the RIS relative to the TRP from a server.

Clause 28. The device of any of clauses 17-21, wherein the device comprises a server.

Clause 29. The device of any of clauses 17-21 or 28, wherein the one or more processing units are configured to: receive, via the transceiver, information indicative of the first ToA and the second ToA from the receiving device; and determine the time difference between the first ToA and the second ToA from the information indicative of the first ToA and the second ToA.

Clause 30. The device of any of clauses 17-21, 28, or 29, wherein the one or more processing units are configured to: determine, based on multilateration from information received from a plurality of receiving devices, a receive angle comprising angle at which the echo signal is received at the RIS; and determine the position of the object additionally based on the receive angle.

Clause 31. The device of any of clauses 17-21 or 28-30, wherein the one or more processing units are configured to: determine a time gap comprising a difference between a time the TRP transmits the first wireless reference signal and a time the TRP transmits the second wireless reference signal; and determine the position of the object additionally based on the time gap.

Clause 32. The device of any of clauses 17-31, wherein the one or more processing units are configured to configure the RIS to adjust a phase, a magnitude, or both of either or both the LOS wireless signal or the echo signal.

Clause 33. A device comprising: means for configuring a reconfigurable intelligent surface (RIS) to reflect a Line-Of-Sight (LOS) wireless signal toward a receiving device, wherein the LOS wireless signal comprises a first wireless reference signal transmitted by a Transmission Reception Point (TRP) of a wireless communications system; means for configuring the RIS to reflect an echo signal toward the receiving device, wherein the echo signal comprises a reflection, off of an object, of a second wireless reference signal transmitted by the TRP of the wireless communications system; means for determining a position of the object based on: a position of the RIS relative to the TRP, and a time difference between a first Time of Arrival (ToA) of the LOS wireless signal at the receiving device and a second ToA of the echo signal at the receiving device; and means for providing the position of the object.

Clause 34. The device of clause 33, wherein the means for configuring the RIS to reflect the LOS wireless signal and the echo signal toward the receiving device comprises means for controlling the RIS with the TRP or a server.

Clause 34. The device of clause 33 or 34, wherein the device comprises the receiving device.

Clause 35. The device of any of clause 33 or 34, wherein the device comprises a server.

Clause 36. A non-transitory computer-readable medium storing instructions for performing radio frequency (RF) sensing with a receiving device and a reconfigurable intelligent surfaces (RIS) in a wireless communications system, the instructions comprising code for: configuring the RIS to reflect a Line-Of-Sight (LOS) wireless signal toward a receiving device, wherein the LOS wireless signal comprises a first wireless reference signal transmitted by a Transmission Reception Point (TRP) of the wireless communications system; configuring the RIS to reflect an echo signal toward the receiving device with the RIS, wherein the echo signal comprises a reflection, off of an object, of a second wireless reference signal transmitted by the TRP of the wireless communications system; determining a position of the object based on: a position of the RIS relative to the TRP, and a time difference between a first Time of Arrival (ToA) of the LOS wireless signal at the receiving device and a second ToA of the echo signal at the receiving device; and providing the position of the object.

What is claimed is:

1. A method of performing radio frequency (RF) sensing with a receiving device and a reconfigurable intelligent surface (RIS) in a wireless communications system, the method comprising:
configuring the RIS to reflect a Line-Of-Sight (LOS) wireless signal toward the receiving device, wherein the LOS wireless signal comprises a first wireless reference signal transmitted by a Transmission Reception Point (TRP) of the wireless communications system;
configuring the RIS to reflect an echo signal toward the receiving device, wherein the echo signal comprises a reflection, off of an object, of a second wireless reference signal transmitted by the TRP of the wireless communications system;
determining a position of the object based on:
a position of the RIS relative to the TRP, and
a time difference between a first Time of Arrival (ToA) of the LOS wireless signal at the receiving device and a second ToA of the echo signal at the receiving device; and
providing the position of the object.

2. The method of claim 1, wherein configuring the RIS to reflect the LOS wireless signal and the echo signal toward the receiving device comprises controlling the RIS with the TRP or a server.

3. The method of claim 2, wherein the server controls the RIS, and wherein the server further:
determines a position of the receiving device; and
configures the RIS to reflect the LOS wireless signal and the echo signal toward the receiving device based on the position of the receiving device.

4. The method of claim 1, further comprising including, in the first wireless reference signal and the second wireless reference signal, an identifier of the RIS.

5. The method of claim 1, wherein the receiving device comprises a mobile device or another TRP.

6. The method of claim 1, wherein the receiving device determines the position of the object.

7. The method of claim 6, further comprising determining, with the receiving device, a receive angle comprising an angle at which the echo signal is received at the RIS, and wherein the receiving device determines the position of the object additionally based on the receive angle.

8. The method of claim 6, further comprising determining, with the receiving device, a time gap comprising a difference between a time the TRP transmits the first wireless reference signal and a time the TRP transmits the second wireless reference signal, wherein determining the position of the object is further based on the time gap.

9. The method of claim 8, wherein determining the time gap comprises receiving an indication of the time gap from a server.

10. The method of claim 6, wherein providing the position of the object comprises providing the position of the object to an application executed by the receiving device.

11. The method of claim 6, further comprising sending information indicative of the position of the RIS relative to the TRP from a server to the receiving device.

12. The method of claim 1, wherein a server determines the position of the object.

13. The method of claim 12, further comprising:
receiving, at the server, information indicative of the first ToA and the second ToA from the receiving device; and
determining, with the server, the time difference between the first ToA and the second ToA from the information indicative of the first ToA and the second ToA.

14. The method of claim 12, further comprising:
determining, with the server based on multilateration from information received from a plurality of receiving devices, a receive angle comprising angle at which the echo signal is received at the RIS;
wherein the server determines the position of the object additionally based on the receive angle.

15. The method of claim 12, further comprising determining, with the server, a time gap comprising a difference between a time the TRP transmits the first wireless reference signal and a time the TRP transmits the second wireless reference signal, wherein determining the position of the object is further based on the time gap.

16. The method of claim 1, further comprising configuring the RIS to adjust a phase, a magnitude, or both of either or both the LOS wireless signal or the echo signal.

17. A device comprising:
a transceiver;
a memory; and
one or more processing units communicatively coupled with the transceiver and the memory, the one or more processing units configured to:
configure a reconfigurable intelligent surface (RIS) to reflect a Line-Of-Sight (LOS) wireless signal toward a receiving device, wherein the LOS wireless signal comprises a first wireless reference signal transmitted by a Transmission Reception Point (TRP) of a wireless communications system;
configure the RIS to reflect an echo signal toward the receiving device, wherein the echo signal comprises a reflection, off of an object, of a second wireless reference signal transmitted by the TRP of the wireless communications system;
determine a position of the object based on:
a position of the RIS relative to the TRP, and
a time difference between a first Time of Arrival (ToA) of the LOS wireless signal at the receiving device and a second ToA of the echo signal at the receiving device; and
provide the position of the object.

18. The device of claim 17, wherein:
the device comprises the TRP or a server; and
to configure the RIS to reflect the LOS wireless signal and the echo signal toward the receiving device, the one or more processing units are configured to control the RIS via the transceiver.

19. The device of claim 18, wherein the device comprises the server, and wherein the one or more processing units are further configured to:
determine a position of the receiving device; and
configure the RIS to reflect the LOS wireless signal and the echo signal toward the receiving device based on the position of the receiving device.

20. The device of claim 17, wherein the one or more processing units are further configured to include, in the first wireless reference signal and the second wireless reference signal, an identifier of the RIS.

21. The device of claim 17, wherein the receiving device comprises a mobile device or another TRP.

22. The device of claim 17, wherein the device comprises the receiving device.

23. The device of claim 22, wherein the one or more processing units are further configured to determine a receive angle comprising an angle at which the echo signal is received at the RIS, and wherein the one or more processing units are configured to determine the position of the object additionally based on the receive angle.

24. The device of claim 22, wherein the one or more processing units are further configured to determine a time gap comprising a difference between a time the TRP transmits the first wireless reference signal and a time the TRP transmits the second wireless reference signal, and wherein the one or more processing units are configured to determine the position of the object is further based on the time gap.

25. The device of claim 24, wherein, to determine the time gap, the one or more processing units are configured to receive an indication of the time gap from a server.

26. The device of claim 22, wherein, to provide the position of the object, the one or more processing units are configured to provide the position of the object to an application executed by the receiving device.

27. The device of claim 22, wherein the one or more processing units are configured to receive, via the transceiver, information indicative of the position of the RIS relative to the TRP from a server.

28. The device of claim 17, wherein the device comprises a server.

29. The device of claim 28, wherein the one or more processing units are configured to:
receive, via the transceiver, information indicative of the first ToA and the second ToA from the receiving device; and
determine the time difference between the first ToA and the second ToA from the information indicative of the first ToA and the second ToA.

30. The device of claim 28, wherein the one or more processing units are configured to:
determine, based on multilateration from information received from a plurality of receiving devices, a receive angle comprising angle at which the echo signal is received at the RIS; and
determine the position of the object additionally based on the receive angle.

31. The device of claim 28, wherein the one or more processing units are configured to:
determine a time gap comprising a difference between a time the TRP transmits the first wireless reference signal and a time the TRP transmits the second wireless reference signal; and
determine the position of the object additionally based on the time gap.

32. The device of claim 17, wherein the one or more processing units are configured to configure the RIS to adjust a phase, a magnitude, or both of either or both the LOS wireless signal or the echo signal.

33. A device comprising:
means for configuring a reconfigurable intelligent surface (RIS) to reflect a Line-Of-Sight (LOS) wireless signal toward a receiving device, wherein the LOS wireless signal comprises a first wireless reference signal transmitted by a Transmission Reception Point (TRP) of a wireless communications system;
means for configuring the RIS to reflect an echo signal toward the receiving device, wherein the echo signal comprises a reflection, off of an object, of a second wireless reference signal transmitted by the TRP of the wireless communications system;
means for determining a position of the object based on:
a position of the RIS relative to the TRP, and
a time difference between a first Time of Arrival (ToA) of the LOS wireless signal at the receiving device and a second ToA of the echo signal at the receiving device; and
means for providing the position of the object.

34. The device of claim 33, wherein the means for configuring the RIS to reflect the LOS wireless signal and the echo signal toward the receiving device comprises means for controlling the RIS with the TRP or a server.

35. The device of claim 33, wherein the device comprises the receiving device.

36. The device of claim 33, wherein the device comprises a server.

37. A non-transitory computer-readable medium storing instructions for performing radio frequency (RF) sensing with a receiving device and a reconfigurable intelligent surfaces (RIS) in a wireless communications system, the instructions comprising code for:
configuring the RIS to reflect a Line-Of-Sight (LOS) wireless signal toward a receiving device, wherein the LOS wireless signal comprises a first wireless reference signal transmitted by a Transmission Reception Point (TRP) of the wireless communications system;
configuring the RIS to reflect an echo signal toward the receiving device, wherein the echo signal comprises a reflection, off of an object, of a second wireless reference signal transmitted by the TRP of the wireless communications system;
determining a position of the object based on:
a position of the RIS relative to the TRP, and
a time difference between a first Time of Arrival (ToA) of the LOS wireless signal at the receiving device and a second ToA of the echo signal at the receiving device; and
providing the position of the object.

* * * * *